United States Patent
Noh et al.

(10) Patent No.: US 12,021,676 B2
(45) Date of Patent: *Jun. 25, 2024

(54) METHOD AND APPARATUS FOR TRANSMITTING AND RECEIVING UPLINK REFERENCE SIGNAL IN WIRELESS COMMUNICATION SYSTEMS

(71) Applicant: Samsung Electronics Co., Ltd., Suwon-si (KR)

(72) Inventors: Hoondong Noh, Suwon-si (KR); Jinhyun Park, Suwon-si (KR); Heecheol Yang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,038

(22) Filed: May 24, 2022

(65) Prior Publication Data

US 2022/0294585 A1 Sep. 15, 2022

Related U.S. Application Data

(63) Continuation of application No. 16/793,411, filed on Feb. 18, 2020, now Pat. No. 11,343,040.

(30) Foreign Application Priority Data

Feb. 15, 2019 (KR) ........................ 10-2019-0017611

(51) Int. Cl.
*H04L 27/26* (2006.01)
*H04B 7/0456* (2017.01)
(Continued)

(52) U.S. Cl.
CPC ....... *H04L 27/2614* (2013.01); *H04B 7/0456* (2013.01); *H04L 5/0048* (2013.01);
(Continued)

(58) Field of Classification Search
None
See application file for complete search history.

(56) References Cited

U.S. PATENT DOCUMENTS

2012/0087427 A1 4/2012 Noh et al.
2012/0314678 A1 12/2012 Ko et al.
(Continued)

FOREIGN PATENT DOCUMENTS

CN 108886448 A 11/2018
KR 10-2018-0022071 A 3/2018
(Continued)

OTHER PUBLICATIONS

Samsung, "PRB bundling for NR DMRS", R1-1705339, 3GPP TSG RAN WG1 Meeting #88bis, Spokane, USA, Mar. 24, 2017.
(Continued)

*Primary Examiner* — Bob A Phunkulh
(74) *Attorney, Agent, or Firm* — Jefferson IP Law, LLP

(57) ABSTRACT

A method, performed by a user equipment (UE), of transmitting an uplink (UL) reference signal in a wireless communication system is provided. The method includes receiving first information indicating whether to apply transform precoding and pi/2 binary phase shift keying (BPSK) modulation to a physical uplink shared channel (PUSCH), receiving second information indicating whether to apply the pi/2 BPSK modulation to an UL demodulation reference signal (DMRS), and identifying a sequence having characteristics of a first peak-to-average power ratio (PAPR) based on the first information and the second information.

20 Claims, 15 Drawing Sheets

(51) Int. Cl.
  *H04L 5/00* (2006.01)
  *H04L 27/18* (2006.01)
  *H04W 72/21* (2023.01)
(52) U.S. Cl.
  CPC .......... *H04L 5/0051* (2013.01); *H04L 27/186* (2013.01); *H04L 27/2613* (2013.01); *H04L 27/2615* (2013.01); *H04L 27/2692* (2013.01); *H04W 72/21* (2023.01); *H04L 27/2636* (2013.01)

(56) References Cited

U.S. PATENT DOCUMENTS

| | | |
|---|---|---|
| 2015/0023270 A1 | 1/2015 | Park et al. |
| 2015/0055576 A1 | 2/2015 | Zhang et al. |
| 2015/0326290 A1 | 11/2015 | Harrison et al. |
| 2016/0227520 A1 | 8/2016 | Davydov et al. |
| 2019/0036746 A1 | 1/2019 | Hwang et al. |
| 2019/0090201 A1* | 3/2019 | Akkarakaran ........ H04L 5/0053 |
| 2019/0149298 A1 | 5/2019 | Yang et al. |
| 2019/0199417 A1 | 6/2019 | Noh et al. |
| 2019/0207730 A1 | 7/2019 | Park et al. |
| 2020/0083939 A1 | 3/2020 | Park et al. |
| 2020/0236524 A1* | 7/2020 | Ye .................... H04W 72/0446 |
| 2020/0259693 A1 | 8/2020 | Baldemair et al. |
| 2020/0296736 A1 | 9/2020 | Yokomakura et al. |
| 2021/0022117 A1 | 1/2021 | Yi et al. |
| 2021/0045145 A1* | 2/2021 | Yoshimura ........ H04W 72/1268 |
| 2021/0058903 A1* | 2/2021 | Takeda .................. H04W 72/04 |
| 2021/0091904 A1* | 3/2021 | Matsumura ........... H04L 5/0048 |
| 2021/0092732 A1* | 3/2021 | Lee ...................... H04L 1/0057 |
| 2021/0185706 A1 | 6/2021 | Park et al. |
| 2021/0195567 A1 | 6/2021 | Yi et al. |
| 2021/0266887 A1* | 8/2021 | Zhang .................. H04L 5/0053 |
| 2021/0315001 A1* | 10/2021 | Matsumura ........... H04W 72/23 |
| 2021/0377085 A1 | 12/2021 | Wang et al. |
| 2022/0006569 A1 | 1/2022 | Lee et al. |
| 2022/0085937 A1* | 3/2022 | Gao .................... H04L 27/2614 |
| 2022/0104254 A1* | 3/2022 | Matsumura ........... H04W 76/10 |

FOREIGN PATENT DOCUMENTS

| | | |
|---|---|---|
| KR | 10-2018-0119265 A | 11/2018 |
| WO | 2017-135693 A1 | 8/2017 |
| WO | 2018-182381 A1 | 4/2018 |
| WO | 2018/134850 A1 | 7/2018 |

OTHER PUBLICATIONS

Qualcomm Incorporated, "Discussion on PRB bundling for DL", R1-1705580, 3GPP TSG RAN WG1 Meeting #88bis, Spokane, USA, Mar. 25, 2017.
Nokia, "On details of PRB Bundling", R1-1705958, 3GPP TSG RAN WG1 Meeting #88bis, Spokane, USA, Mar. 24, 2017.
3GPP TS 38.212, "3rd Generation Partnership Project; Technical Specification Group Radio Access Network; NR Multiplexing and channel coding", V15.7.0, Sep. 2019.
3GPP TS 38.214, "3rd Generation Partnership Project; Technical Specification Group Radio Access Network; NR; Physical layer procedures for data", V16.0.0, Dec. 2019.
Qualcomm Incorporated et al., "Joint Proposal on length-12, length-18, and length-24 CG sequences for pi/2 BPSK", R1-1901362, Jan. 22, 2019.
International Search Report dated May 22, 2020, issued in an International Application No. PCT/KR2020/002201.
Qualcomm Incorporated, 'Lower PAPR reference signals', R1-1813898, 3GPP TSG RAN WG1 Meeting #95, Nov. 11, 2018, Spokane, WA, USA.
Qualcomm Incorporated, 'Remaining issues on DMRS design', R1-1721432, 3GPP TSG RAN WG1 Meeting 91, Dec. 5, 2017, Reno, USA.
U.S. Office Action dated Dec. 9, 2020, issued by the U.S. Patent and Trademark Office; U.S. Appl. No. 16/607,548.
Extended European Search Report dated Mar. 16, 2022, issued in a counterpart European Application No. 20755152.4.
Qualcomm Incorporated; Lower PAPR reference signals; 3GPP TSG RAN WG1 Ad-Hoc Meeting 1901; R1-1901317; Jan. 21, 2019, Taipei, Taiwan.
Ericsson; Feature lead summary of low PAPR RS; 3GPP TSG RAN WG1 Meeting Ad-Hoc Meeting 1901; R1-1901293; Jan. 22, 2019, Taipei, Taiwan.
Nokia, Nokia Shanghai Bell; Discussion on Low PAPR RS; 3GPP TSG RAN WG1 Ad-hoc Meeting #1901; R1-1900694; Jan. 20, 2019, Taipei, Taiwan.
3rd Generation Partnership Project; Technical Specification Group Radio Access Network; NR; Radio Resource Control (RRC) protocol specification (Release 15), 3GPP TS 38.331 V15.2.1 (Jun. 2018), Jun. 21, 2018.
Korean Office Action dated Mar. 3, 2023, issued in Korean Patent Application No. 10-2019-0017611.
Indian Office Action dated Jul. 21, 2023, issued in Indian Patent Application No. 202137041048.
Chinese Office Action dated Dec. 22, 2023, issued in Chinese Patent Application No. 202080028226.6.

* cited by examiner

METHOD AND APPARATUS FOR TRANSMITTING AND RECEIVING UPLINK REFERENCE SIGNAL IN WIRELESS COMMUNICATION SYSTEMS

CROSS-REFERENCE TO RELATED APPLICATION(S)

This application is a continuation application of prior application Ser. No. 16/793,411, filed on Feb. 18, 2020, which has been issued as U.S. Pat. No. 11,343,040 on May 24, 2022, which is based on and claimed priority under 35 U.S.C. § 119(a) of a Korean patent application number 10-2019-0017611, filed on Feb. 15, 2019, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for transmitting and receiving an uplink (UL) reference signal.

2. Description of Related Art

To meet the soaring demand with respect to wireless data traffic because of the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as beyond-4G-network communication systems or post-long term evolution (LTE) systems. For higher data transmission rates, implementation of 5G communication systems in ultra-high frequency bands (mm-Wave) is being considered. In 5G communication systems, beamforming, massive multi-input multi-output (MIMO), full dimensional MIMO (FD-MIMO), array antenna, analog beamforming, and large-scale antenna technologies have been discussed as ways of alleviating propagation path loss and increasing propagation distances in ultra-high frequency bands. For system network improvement, in 5G communication systems, technologies such as evolved small cell, advanced small cell, cloud radio access network (RAN), ultra-dense network, device to device (D2D) communication, wireless backhaul, mobile network, cooperative communication, coordinated multi-points (CoMPs), and interference cancellation have been developed. Also, for 5G systems, other technologies have been developed, such as, hybrid frequency-shift keying (FSK) and quadrature amplitude modulation (QAM) modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. To implement the IoT, various technological elements, such as sensing technology, wired/wireless communication and network infrastructure, service interface technology, and security technology, are required, and recently technologies related to sensor networks for connecting objects, machine to machine (M2M), machine type communication (MTC), and so forth have been researched. Such an IoT environment may provide intelligent Internet technology (IT) services that create new value in human life by collecting and analyzing data generated among connected objects. IoT may be applied to a variety of fields including smart homes, smart buildings, smart cities, smart cars or connected cars, smart grids, health care, smart appliances, advanced medical services, and so forth through convergence and combination between existing IT and various industries.

Thus, various attempts have been made to apply 5G communication systems to IoT networks. For example, 5G communication technology such as a sensor network, M2M, MTC, etc., has been implemented by a scheme such as beamforming, MIMO, array antennas, and so forth. The application of cloud RAN as a Big Data processing technology may also be an example of the convergence of 5G technology and IoT technology.

As described above, various services may be provided as mobile communication systems develop, and accordingly, ways of transmitting and receiving a UL reference signal to smoothly provide such services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for transmitting and receiving an uplink (UL) reference signal in a wireless communication system.

Additional aspects will be set forth in part in the description which follows and, in part, will be apparent from the description, or may be learned by practice of the presented embodiments.

In accordance with an aspect of the disclosure, a method, performed by a user equipment (UE), of transmitting an UL reference signal in a wireless communication system is provided. The method includes receiving first information indicating whether to apply transform precoding and pi/2 binary phase shift keying (BPSK) modulation to a physical uplink shared channel (PUSCH), receiving second information indicating whether to apply the pi/2 BPSK modulation to an UL demodulation reference signal (DMRS), and identifying a sequence having characteristics of a first peak-to-average power ratio (PAPR) based on the first information and the second information.

In accordance with another aspect of the disclosure, a method is provided. The method includes transmitting a DMRS by using the identified sequence.

The receiving of the information indicating whether to apply the transform precoding and the pi/2 BPSK modulation to the PUSCH may include receiving information indicating whether to apply the transform precoding and the pi/2 BPSK modulation to the PUSCH, by high-layer signaling.

The identifying of the sequence having characteristics of the first PAPR, based on the information indicating whether to apply the transform precoding and the pi/2 and BPSK modulation to the PUSCH and the information indicating whether to apply the pi/2 BPSK modulation to the UL DMRS may include identifying a sequence having a second PAPR when the transform precoding is not applied to the PUSCH or when the pi/2 BPSK modulation is not applied to the PUSCH.

The UL DMRS may include a PUSCH DMRS and a physical uplink control channel (PUCCH) DMRS.

In accordance with an aspect of the disclosure, a UE for transmitting an UL reference signal in a wireless communication system is provided. The UE includes a transceiver, and at least one processor connected with the transceiver and configured to receive information indicating whether to apply transform precoding and pi/2 BPSK modulation to a PUSCH, receive information indicating whether to apply the pi/2 BPSK modulation to an UL DMRS, and identify a sequence having characteristics of a first PAPR, based on the information indicating whether to apply the transform precoding and the pi/2 and BPSK modulation to the PUSCH and the information indicating whether to apply the pi/2 BPSK modulation to UL DMRS.

The at least one processor may be further configured to transmit a DMRS by using the identified sequence.

The at least one processor may be further configured to receive information indicating whether to apply the transform precoding and the pi/2 BPSK modulation to the PUSCH, by high-layer signaling.

The at least one processor may be further configured to identify to use a sequence having a second PAPR when the transform precoding is not applied to the PUSCH or when the pi/2 BPSK modulation is not applied to the PUSCH.

The UL DMRS may include a PUSCH DMRS and a PUCCH DMRS.

In accordance with an aspect of the disclosure, a method, performed by a base station, of receiving an UL reference signal in a wireless communication system is provided. The method includes transmitting, to a UE, information indicating whether to apply transform precoding and pi/2 BPSK modulation to a PUSCH, transmitting, to the UE, information indicating whether to apply the pi/2 BPSK modulation to an UL DMRS, and receiving, from the UE, a DMRS identified based on the information indicating whether to apply the transform precoding and the pi/2 and BPSK modulation to the PUSCH and the information indicating whether to apply the pi/2 BPSK modulation to the UL DMRS.

The DMRS may be identified by using a sequence having characteristics of a first PAPR, the sequence being generated based on the information indicating whether to apply the transform precoding and the pi/2 and BPSK modulation to the PUSCH and the information indicating whether to apply the pi/2 BPSK modulation to the UL DMRS.

The transmitting of the information indicating whether to apply the transform precoding and the pi/2 BPSK modulation to the PUSCH may include transmitting information indicating whether to apply the transform precoding and the pi/2 BPSK modulation to the PUSCH, by high-layer signaling.

The DMRS may be identified by using a sequence having a second PAPR when the transform precoding is not applied to the PUSCH or when the pi/2 BPSK modulation is not applied to the PUSCH.

The first UL DMRS may include a PUSCH DMRS and a PUCCH DMRS.

In accordance with an aspect of the disclosure, a base station for receiving an UL reference signal in a wireless communication system is provided. The base station includes a transceiver, and at least one processor connected with the transceiver and configured to transmit, to a UE, information indicating whether to apply transform precoding and pi/2 BPSK modulation to a PUSCH, transmit, to the UE, information indicating whether to apply the pi/2 BPSK modulation to an UL DMRS, and receive, from the UE, a DMRS identified based on the information indicating whether to apply the transform precoding and the pi/2 and BPSK modulation to the PUSCH and the information indicating whether to apply the pi/2 BPSK modulation to the UL DMRS.

The DMRS may be identified by using a sequence having characteristics of a first PAPR, the sequence being generated based on the information indicating whether to apply the transform precoding and the pi/2 and BPSK modulation to the PUSCH and the information indicating whether to apply the pi/2 BPSK modulation to the UL DMRS.

The at least one processor may be further configured to transmit information indicating whether to apply the transform precoding and the pi/2 BPSK modulation to the PUSCH, by high-layer signaling.

The DMRS may be identified by using a sequence having a second PAPR when the transform precoding is not applied to the PUSCH or when the pi/2 BPSK modulation is not applied to the PUSCH.

The UL DMRS may include a PUSCH DMRS and a PUCCH DMRS.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
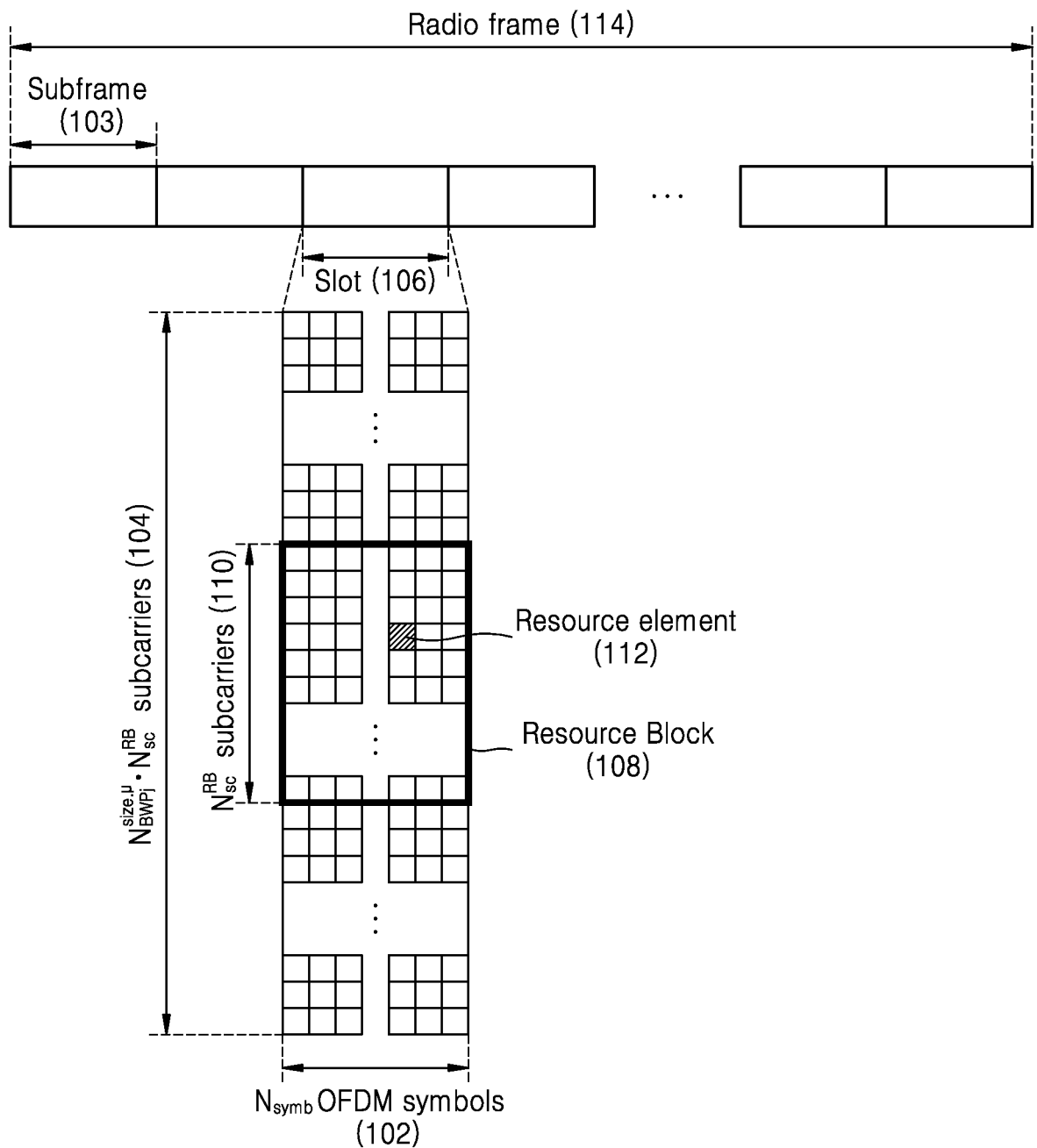
FIG. 1 illustrates a structure of a time-frequency domain that is a radio resource domain in which data or a control channel is transmitted in a downlink (DL) in a new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the disclosure and a method for achieving them will be apparent with reference to embodiments of the disclosure described below together with the attached drawings. However, the disclosure is not limited to the disclosed embodiments of the disclosure, but may be implemented in various manners, and the embodiments of the disclosure are provided to complete the disclosure of the disclosure and to allow those of ordinary skill in the art to understand the scope of the disclosure. The disclosure is defined by the category of the claims. Throughout the specification, an identical reference numeral will indicate an identical element.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Meanwhile, it is known to those of ordinary skill in the art that blocks of a flowchart and a combination of flowcharts may be represented and executed by computer program instructions. These computer program instructions may also be stored in a general-purpose computer, a special-purpose computer, or a processor of other programmable data processing devices, such that the instructions implemented by the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions that execute the computer or other programmable apparatus may provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order indicated. For example, two blocks shown in succession may, in fact, be executed substantially concurrently or the blocks may sometimes be executed in the reverse order, depending on the functionality involved.

In the current embodiment, the term 'unit', as used herein, denotes a software or hardware component, such as a field programmable gate array (FPGA) or application specific integrated circuit (ASIC), which performs certain tasks. However, the meaning of '~unit' is not limited to software or hardware. '~unit' may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~unit(s)' may be combined into fewer components and '~unit(s)' or further separated into additional components and '~unit(s)'. In addition, components and '~unit(s)' may be implemented to execute one or more central processing units (CPUs) in a device or a secure multimedia card.

A wireless communication system has evolved from an initial one that provides a voice-oriented service to a broadband wireless communication system that provides a high-speed and high-quality packet data service, like the communication standards, such as $3^{rd}$-Generation Partnership Project (3GPP) high speed packet access (HSPA), Long Term Evolution (LTE) or Evolved Universal Terrestrial Radio Access (E-UTRA), LTE-Advanced (LTE-A or E-UTRA Evolution), 3GPP2 high rate packet data (HRPD), Ultra Mobile Broadband (UMB), the Institute of Electrical and Electronics Engineers (IEEE) 802.16e, etc. As a 5th-generation (5G) wireless communication system, 5G or new radio (NR) communication standards have been established.

In a Rel-15 NR system, to improve a coverage of an uplink (UL) data channel, in UL transmission of a terminal, pi/2 binary phase shift keying (BPSK) modulation having a lower peak-to-average power ratio (PAPR) than BPSK or quadrature phase shift keying (QPSK) having a fixed constellation may be applied. Meanwhile, in the Rel-15 NR system, QPSK is used for a UL demodulation reference signal (DMRS), a PAPR of an orthogonal frequency division multiplexing (OFDM) symbol carrying the UL DMRS becomes a bottleneck, making it difficult to expect substantial UL coverage improvement. To solve this problem, in Rel-16 NR, a pi/2 BPSK-based DMRS may be newly introduced. Pi/2 BPSK-based UL coverage improvement is not an essential factor for any network environment, and in particular, a Rel-15 terminal or base station may not understand a Rel-16 new reference signal (RS) sequence, requiring a function for properly selecting whether to configure pi/2 BPSK-based UL transmission or support the terminal. According to the disclosure, pi/2 BPSK-based UL RS transmission may be effectively indicated or determined depending on a channel or a procedure having an influence upon UL transmission such as a random access channel (RACH), a UL grant, etc.

The base station performs resource assignment of the terminal, and may be at least one of gNode B, next generation node B (gNB), evolved Node B (eNode B), Node B, base station (BS), a wireless access unit, a base station controller, or a node on a network. The terminal may include a UE, a mobile station (MS), a cellular phone, a smartphone, a computer, or a multimedia system capable of performing communication functions. While embodiments of the disclosure are described by using an NR system or a Long Term Evolution (LTE)/LTE-Advanced (LTE-A) system as an example, the embodiments of the disclosure may also be applied to other communication systems having a similar technical background or channel form. Also, the embodiments of the disclosure may also be applied to other communication systems through some modifications within a range that does not largely depart from the scope of the disclosure based on determination of a skilled person.

The matters of the disclosure are applicable to frequency division duplex (FDD) and time division duplex (TDD) systems.

Hereinafter, in the disclosure, high-layer signaling is a method of delivering a signal from a base station to a terminal by using a downlink (DL) data channel of a physical layer or from the UE to the BS by using a UL data channel of the physical layer, and may be mentioned as radio resource control (RRC) signaling, packet data convergence protocol (PDCP) signaling, or a medium access control (MAC) control element (CE).

While the foregoing examples have been described through multiple embodiments in the disclosure, there are not independent and one or more embodiments of the disclosure may be applied at the same time or in a complex manner.

Figure 2:
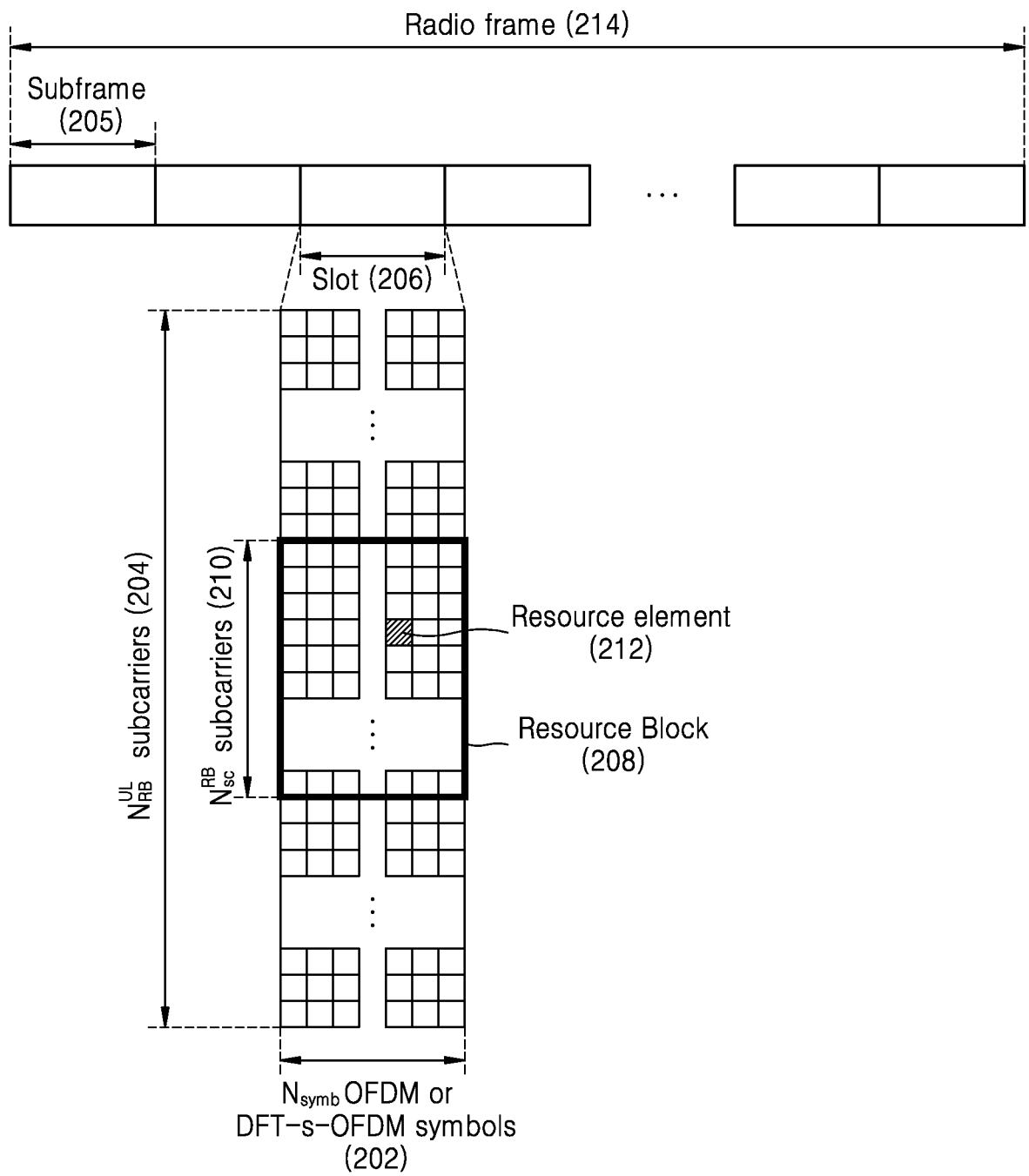
FIG. 2 illustrates a structure of a time-frequency domain that is a radio resource domain in which data or a control channel is transmitted in an uplink (UL) in an NR system according to an embodiment of the disclosure.

In an NR system, as a representative example of a broadband wireless communication system, OFDM is employed in a DL (102 of FIG. 1) and discrete Fourier transform spread OFDM (DFT-s-OFDM) and OFDM both are employed in a UL (202 of FIG. 2). The UL means a radio link through which a UE transmits data or a control signal to a base station (gNB or BS), and the DL means a radio link through which the base station transmits data or a control signal to the UE. The above-described multiple access scheme separates data or control information for each user by allocating and operating time-frequency resources on which the data or the control information is carried for each user, so that the time-frequency resources do not overlap each other, that is, so that orthogonality is realized.

The 5G or NR system employs a hybrid automatic repeat request (HARQ) scheme that retransmits data in a physical layer when decryption fails in initial transmission of the data. HARQ refers to a scheme in which when a receiver fails to accurately decrypt (decode) data, the receiver transmits information indicating a decoding failure, i.e., a negative acknowledgement (NACK), to a transmitter to allow the transmitter to retransmit the data in the physical layer. The receiver improves data reception performance by combining the data retransmitted by the transmitter with data that fails to be decoded previously. When accurately decoding the data, the receiver transmits information indicating a decoding success, i.e., an acknowledgement (ACK), to the transmitter to allow the transmitter to transmit new data.

FIG. 1 illustrates a structure of a time-frequency domain that is a radio resource domain in which data or a control channel is transmitted in DL in an NR system according to an embodiment of the disclosure.

Referring to FIG. 1, a horizontal axis represents a time domain, and a vertical axis represents a frequency domain. In the frequency domain, a minimum transmission unit is a subcarrier, and in the NR system, a total of five types of subcarrier spacing or numerology are supported as shown in Table 1. In Table 1, $\Delta f$ indicates an absolute value of numerology, and $\mu$ indicates an index of each numerology.

TABLE 1

| $\mu$ | $\Delta f = 2^{\mu} \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In the NR system, the terminal may be configured with one or more bandwidth parts (BWPs) including some bands in the entire system band, and a position of a start resource block (RB) and a length of an RB in an $i^{th}$ BWP may be determined by parameters $N_{BWP,i}^{start,\mu}$ and $N_{BWP,i}^{size,\mu}$ configured by a higher layer. The base station may indicate one of a BWP configured through downlink control information (DCI) and transmit a DL signal or cause the terminal to transmit a UL signal in the entire band of the indicated BWP or a part thereof. One bandwidth of the BWP may be composed of a total of $N_{BWP,i}^{start,\mu} \times N_{sc}^{RB}$ subcarriers 104.

Herein, $N_{sc}^{RB}$ may indicate the number of subcarriers constituting one RB, and may be $N_{sc}^{RB}=12$.

In the time domain, a minimum transmission unit is an OFDM symbol, and $N_{symb}$ OFDM symbols 102 may constitute one slot 106 in which $N_{symb}=14$. One subframe 103 may include one or more slots, and ten subframes may constitute one radio frame 114. The number of slots constituting one subframe, ($N_{slot}^{subframe,\mu}$), may be determined according to numerology, as shown in Table 2.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

A length of a subframe may be 1.0 ms, and a length of a slot may be inversely proportional to a subcarrier spacing based on a subcarrier spacing of 15 kHz (μ=15 kHz) (for example, 0.5 ms, 0.25 ms, and 0.125 ms, respectively, in μ=30 kHz, 60 kHz, 120 kHz, 240 kHz).

In the time-frequency domain, a basic unit of a resource may be a resource element (RE) 112, and may be indicated as an OFDM symbol index and a subcarrier index. A RB or a physical RB (PRB) 108 may be defined as $N_{symb}$ consecutive OFDM symbols 102 in the time domain and $N_{sc}^{RB}$ consecutive subcarriers 110 in the frequency domain. Accordingly, one RB 108 is composed of $N_{symb} \times N_{sc}^{RB}$ REs 112. As described above, in the NR system, generally, $N_{symb}=7$ and NRB=12.

FIG. 2 illustrates a structure of a time-frequency domain that is a radio resource domain in which data or a control channel is transmitted in a UL in an NR system according to an embodiment of the disclosure.

Referring to FIG. 2, a horizontal axis represents a time domain having $N_{symb}$ OFDM symbols 202, and a vertical axis represents a frequency domain having subcarriers 204. Details such as a RE 212, an RB 208, slot 206, subframe 205, radio frame 214, etc., based on numerology configuration are similar with the description of the DL of FIG. 1 and thus will not be described. The base station may be configured to use DFT-s-OFDM depending on a need as well as cyclic prefix (CP) OFDM used in a DL for a UL waveform. The UE configured to use DFT-s-OFDM (or transform precoding) may apply discrete Fourier transform (DFT) to data before applying inverse fast Fourier transform (IFFT) to a transmission symbol. Thus, the transmission symbol transmitted by the terminal may obtain single-carrier characteristics and its PAPR characteristics become superior over CP OFDM, such that the terminal may obtain additional coverage improvement effects in UL transmission.

Figure 3:
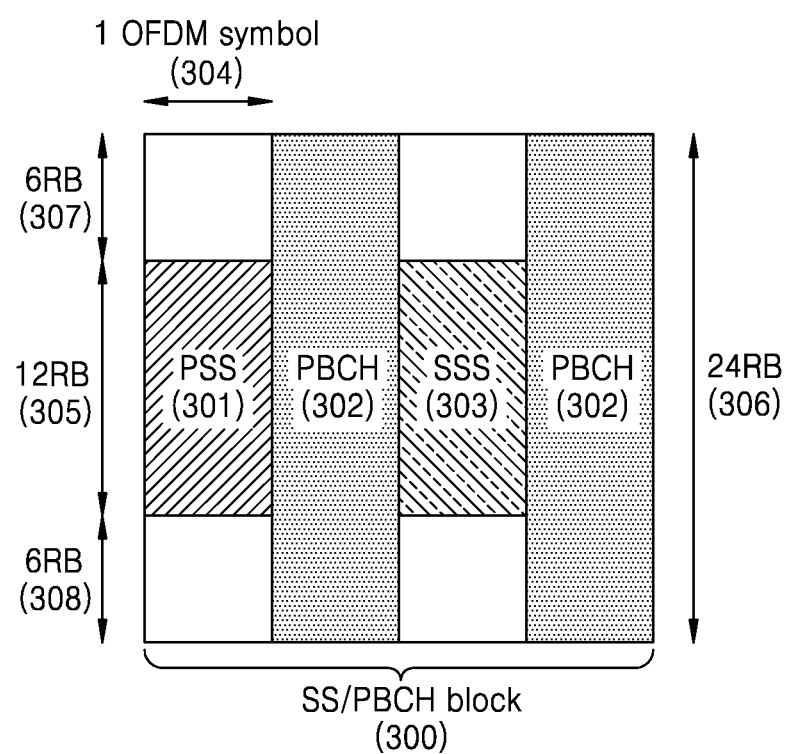
FIG. 3 illustrates a structure of a synchronization signal-physical broadcast channel block (SS-PBCH) block of an NR system according to an embodiment of the disclosure.

FIG. 3 illustrates a synchronization signal (SS)/physical broadcast channel (PBCH) block 300 in an NR system according to an embodiment of the disclosure.

Referring to FIG. 3, the SS/PBCH block 300 may include a primary synchronization signal (PSS) 301, a secondary synchronization signal (SSS) 303, and a PBCH 302.

The PSS 301 and the SSS 303 may be transmitted through 12 RBs 305 in the frequency axis and through one OFDM symbol 304 in the time axis. In the NR system, a total of 1008 different cell identifiers (IDs) may be defined, and the PSS 301 may have three different values and the SSS 303 may have 336 different values according to a physical layer ID of a cell. The terminal may know one of 1008 cell IDs based on a combination of the PSS 301 and the SSS 303 through detection of the PSS 301 and the SSS 303. This may be expressed as Equation 1.

$$N_{ID}^{cell}=3N_{ID}^{(1)}+N_{ID}^{(2)} \qquad \text{Equation 1}$$

$N_{ID}^{(1)}$ may be estimated from the SSS 303 and may have a value between 0 and 335. $N_{ID}^{(2)}$ may be estimated from the PSS 301 and may have a value between 0 and 2. A cell ID, $N_{ID}^{cell}$, may be estimated from a combination of $N_{ID}^{(1)}$ and $N_{ID}^{(2)}$.

The PBCH 302 may be transmitted through 24 RBs 306 in the frequency axis and through 2 OFDM symbols 304 in the time axis. In the PBCH 302, various system information called master information blocks (MIB) may be transmitted and include contents as below.

systemFrameNumber
    subCarrierSpacingCommon
    ssb-SubcarrierOffset
    dmrs-TypeA-Position
    pdcch-ConfigSIB1
    cellBarred
    intraFreqReselection
    spare As described above, the SS/PBCH block 300 may include the PSS 301, the SSS 303, and the PBCH 302, and may be mapped to a total of four OFDM symbols in the time axis. Referring to FIG. 3, 12 RBs 305 corresponding to a transmission bandwidth of the PSS 301 and the SSS 303 and 24 RBs 306 corresponding to a transmission bandwidth of the PBCH 302 are different from each other, such that in an OFDM symbol in which the PSS 301 and the SSS 303 are transmitted in the 24 RBs 306 corresponding to the transmission bandwidth of the PBCH 302, 6 RBs 307 and 6 RBs 308 exist at both sides except for the central 12 RBs in which the PSS 301 and the SSS 303 are transmitted, and the 6 RBs 307 and the 6 RBs 308 may be used for transmission of another signal or may be empty.

The SS/PBCH block may be transmitted in the same analog beam. That is, the PSS 301, the SSS 303, and the PBCH 302 may be transmitted through the same beam. The analog beam is not applicable in the frequency axis, such that the same analog beam is applied in any frequency axis RB in a particular OFDM symbol to which a particular analog beam is applied. That is, four OFDM symbols in which the PSS 301, the SSS 303, and the PBCH 302 are transmitted may be transmitted through the same analog beam.

Meanwhile, the terminal may decode a physical downlink control channel (PDCCH) and a physical downlink shared channel (PDSCH) based on system information included in a received MIB and obtain a system information block (SIB) that may include at least a UL cell bandwidth, a random access parameter, a paging parameter, a parameter related to uplink power control, etc. The terminal may form a radio link with a network through a random access process based on synchronization with a network obtained in a cell search process and system information. In a random access scheme, a contention-based scheme or a contention-free scheme may be used. When the terminal performs cell selection and reselection in an initial access stage of the cell, the contention-based access scheme may be used for movement to RRC_CONNECTED from RRC_IDLE. The contention-free-based random access may be used for arrival of DL data, for a handover, or for reconfiguration of UL synchronization in positioning.

Figure 4:
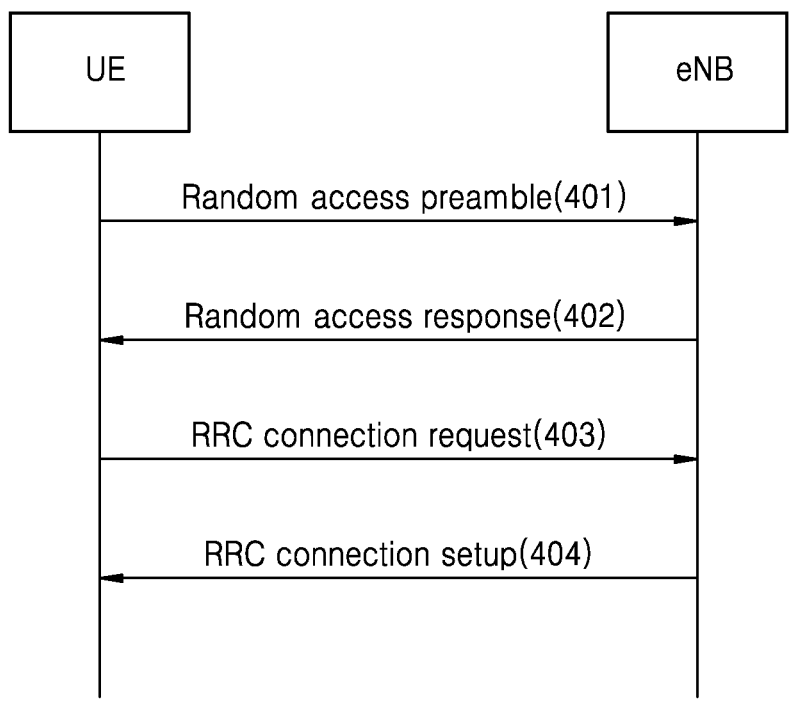
FIG. 4 illustrates a random access process in an NR system according to an embodiment of the disclosure.

FIG. 4 illustrates a contention-based random access process in an NR system according to an embodiment of the disclosure.

Referring to FIG. 4, a random access process may include a procedure of four operations. In operation 401, the terminal may transmit a random access preamble such that the base station may estimate a transmission timing of the terminal. The random access preamble may be transmitted through a UL physical layer channel corresponding to a physical random access channel (PRACH), and will be described in detail below. In operation 401 (Msg. 1) of transmitting the random access preamble, the base station may recognize that there is a random access attempt, and estimate a delay time between the terminal and the base station to adjust a UL transmission timing.

In operation 402 (Msg. 2), the base station may transmit a random access response (RAR) to the detected random access attempt. The RAR may be transmitted through a PDSCH and may include the following message:
- a random access preamble sequence index detected by a network;
- temporary cell radio network temporary identifier (TC-RNTI);
- uplink scheduling grant; and
- Timing advance value.

The terminal having transmitted the preamble may monitor the PDCCH for the RAR in a set time. Frequency domain control information for the PDSCH in which the RAR is transmitted may be obtained from the DCI transmitted through the PSS of the PDCCH configured with a random access radio network temporary identifier (RA-RNTI). The terminal having received the RAR may adjust the uplink transmission timing and go to the next operation.

In operation 403 (Msg. 4), the terminal may receive a downlink message for contention resolution and RRC connection setup from the base station. The contention resolution message may be transmitted through the PDSCH, and scheduling information for the PDSCH may be obtained from the DCI transmitted through the PDCCH configured with a cell radio network temporary identifier (C-RNTI).

Because the contention-free random access process does not contention resolution, operations 401 and 402 may be performed.

Figure 5:
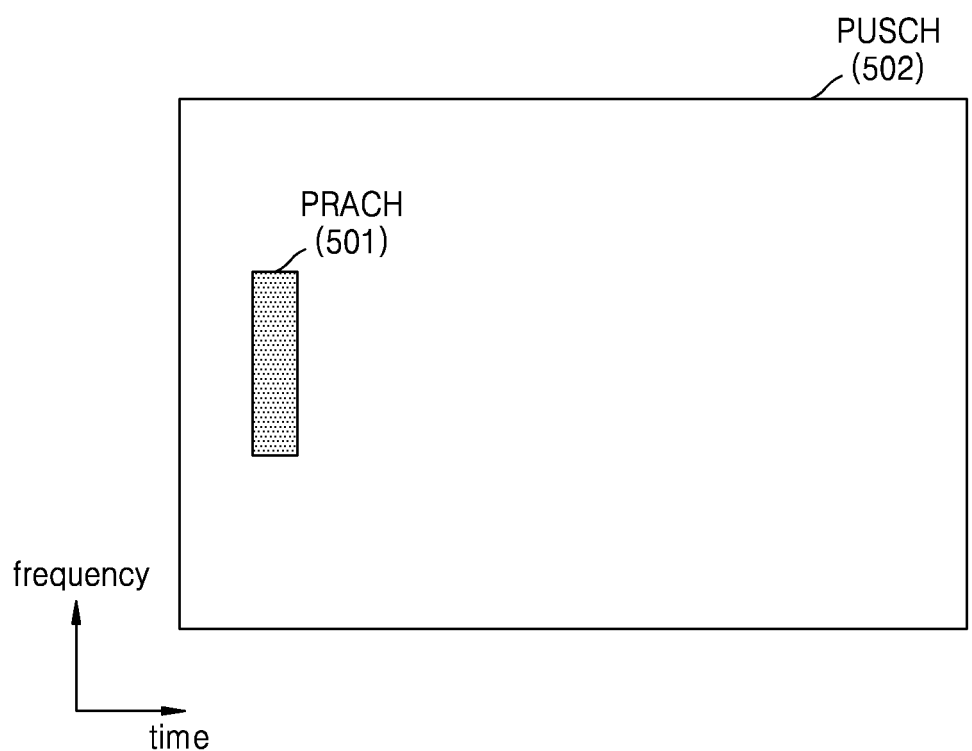
FIG. 5 illustrates a UL physical channel used in a random access process of an NR system according to an embodiment of the disclosure.

FIG. 5 illustrates a UL physical channel used in a random access process of an NR system according to an embodiment of the disclosure.

Referring to FIG. 5, as noted in the random access process in operation 401 of FIG. 4, the terminal may transmit a random access preamble by using a PRACH 501 in a PUSCH 502. In each cell, there are 64 available preamble sequences, and depending on a transmission form, 4 long preamble formats and 9 short preamble formats may be used. The terminal may generate 64 preamble sequences by using a root sequence index and a cyclic shift value that are signaled through system information, and select one sequence at random to use it as a preamble.

The network may notify the terminal of a time-frequency resource that may be used for a PRACH through a SIB or upper signaling. The frequency resource may indicate a start RB point of transmission to the terminal, and the number of RBs used may be determined according to a preamble format and a subcarrier spacing applied. The time resource may notify a preconfigured PRACH configuration period, a subframe index including a PRACH occasion and a start symbol, the number of PRACH occasions in a slot, etc., through PRACH configuration indices 0 through 255.

TABLE 3

| PRACH configuration Index | Preamble format | $n_{SFN}$ mod x = y | | Subframe number | Starting symbol | Number of PRACH slots within a subframe | number of time domain PRACH occasions within a PRACH slot | PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 4 | 1 | 4 | 0 | — | — | 0 |
| 10 | 0 | 4 | 1 | 7 | 0 | — | — | 0 |
| ... | | | | ... | | | | |
| 251 | C | 1 | 0 | 2, 7 | 0 | 2 | 2 | 6 |
| 252 | C2 | 1 | 0 | 1, 4, 7 | 0 | 2 | 2 | 6 |
| 253 | C2 | 1 | 0 | 0, 2, 4, 6, 8 | 0 | 2 | 2 | 6 |
| 254 | C2 | 1 | 0 | 0, 1, 2, 3, 4, 5, 6, 7, 8, 9 | 0 | 2 | 2 | 6 |
| 255 | C2 | 1 | 0 | 1, 3, 5, 7, 9 | 0 | 2 | 2 | 6 |

In operation 403 (Msg. 3), the terminal may transmit an L2/L3 message for a remote radio control (RRC) connection request to the base station. The terminal may transmit a message such as a terminal's ID or HARQ by using an uplink physical layer resource allocated in the random access response of operation 402. In this case, the message may be transmitted through a physical uplink shared channel (PUSCH) that is an uplink physical channel configured with a TC-RNTI.

Figure 6:
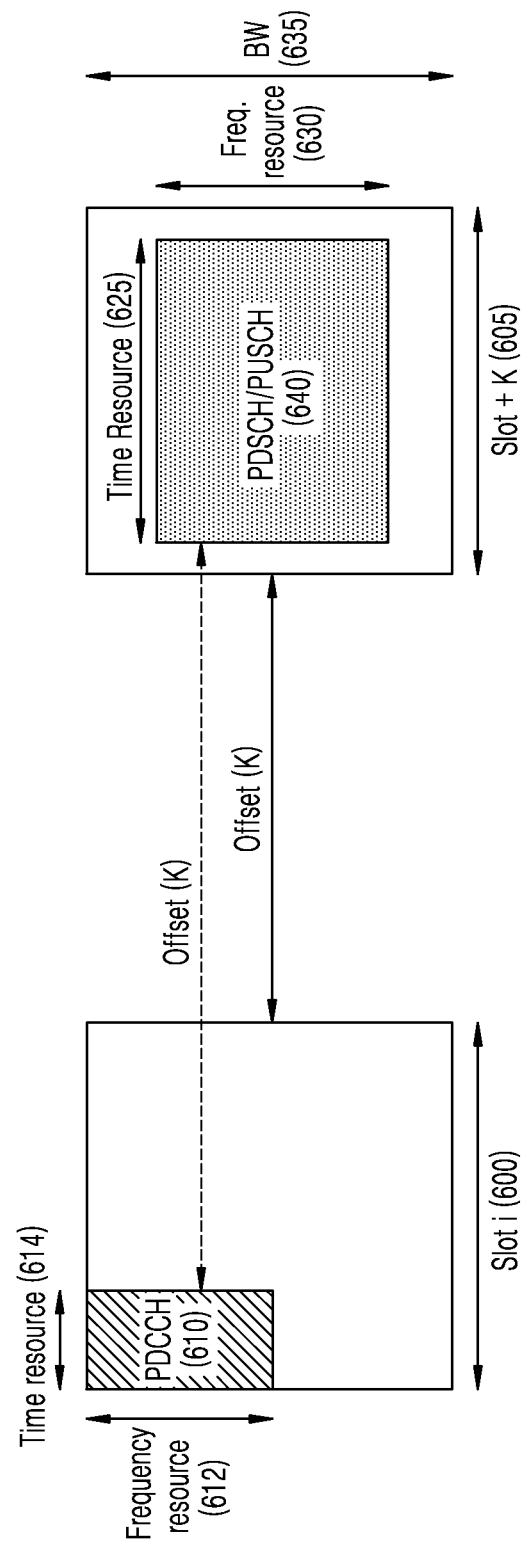
FIG. 6 illustrates a resource region in which a data channel is transmitted in an NR system according to an embodiment of the disclosure.

FIG. 6 illustrates a resource region in which a data channel is transmitted in an NR system according to an embodiment of the disclosure.

Referring to FIG. 6, the terminal may monitor or search a PDCCH 610 in a downlink control channel (hereinafter, a PDCCH) region (hereinafter, a control resource set (CORE-SET) or a search space) configured through an upper-layer signal from the base station. The downlink control channel region may include a time resource 614 in the time domain and a frequency resource 612 in the frequency domain, in which the time resource 614 may be configured in a symbol unit and the frequency resource 612 may be configured in an RB or an RB group unit. When the terminal detects the PDCCH 610 in a slot i 600, the terminal may obtain DCI transmitted through the detected PDCCH 610. The terminal may obtain scheduling information for a DL data channel or a UL data channel through the received DCI. That is, the DCI may include at least a resource region (or a PDSCH transmission region) in which the terminal has to receive a DL data channel (hereinafter, a PDSCH) transmitted from the BS or a resource region allocated to the terminal from the BS for transmission of a UL data channel (PUSCH). For example, the terminal may be scheduled in transmission of the UL data channel (PUSCH) in the following case: The terminal having received the DCI may obtain slot index or offset information K that has to receive the PUSCH through the DCI, and may determine a PUSCH transmission slot index. For example, the terminal may determine that the terminal is scheduled to transmit the PUSCH in a slot (i+K) 605 through the received offset information K based on the slot index i 600 receiving the PDCCH 610. The terminal may determine a PUSCH start symbol or time in the slot (i+K) 605 through the received offset information K based on the CORESET receiving the PDCCH 610. The terminal may obtain information about a PUSCH time-frequency resource region 640 from the DCI in the slot (i+K) 605 for PUSCH transmission. PUSCH transmission frequency resource region information 630 may be PRB-based or PRB group-based information. The PUSCH transmission frequency resource region information 630 may be a region included in an initial UL bandwidth (BW) or an initial UL BWP determined or configured for the terminal through an initial access procedure. When the terminal is configured with a UL BW 635 or a UL BWP through an upper-layer signal, the PUSCH transmission frequency resource region information 630 may be a region included in the UL BW 635 or the UL BWP configured through the upper-layer signal.

PUSCH transmission time resource region information 625 may be symbol-based or symbol group-based information or information indicating absolute time information. The PUSCH transmission time resource region information 625 may be expressed as a combination of a PUSCH transmission start time or symbol with a PUSCH length or a PUSCH end time or symbol and may be included as one field or value in the DCI. The PUSCH transmission time resource region information 625 may be expressed as a PUSCH transmission start time or symbol and a PUSCH length or a PUSCH end time or symbol and may be included as fields or values, respectively, in the DCI. The terminal may transmit a PUSCH in the PUSCH time-frequency resource region 640 determined through the DCI.

In the NR system, for efficient control channel reception of the terminal, various DCI formats may be provided according to a purpose, as shown in Table 4.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |

TABLE 4-continued

| DCI format | Usage |
| --- | --- |
| 2_2 | Transmission of TPC commands for PUCCH and PUSCH |
| 2_3 | Transmission of a group of TPC commands for SRS transmissions by one or more UEs |

For example, the base station may use DCI format 0_0 or DCI format 0_1 to schedule a PUSCH in one cell.

DCI format 0_0 may include at least the following information when it is transmitted together with cyclic redundancy check (CRC) scrambled by a cell radio network temporary identifier (C-RNTI), a configured scheduling RNTI (CS-RNTI), or a new-RNTI.

Identifier for DCI formats (1 bits): a DCI format indicator and set to 1 at all times;

frequency domain resource assignment: indicates frequency-axis resource allocation;

time domain resource assignment: indicates time-axis resource allocation;

frequency hopping flag: an indicator indicating whether to apply frequency hopping;

modulation and coding scheme: indicates a modulation order and a coding rate used in PUSCH transmission;

new data indicator: indicates whether the PUSCH is initially transmitted or retransmitted according to toggling;

redundancy version: indicates a redundancy version used in PUSCH transmission;

HARQ process number: indicates an HARQ process number used for PUSCH transmission;

DCI format 0_1 may include at least the following information when it is transmitted together with CRC scrambled by a C-RNTI, a CS-RNTI, a semi-persistent channel state information (CSI) RNTI (SP-CSI-RNTI), or a new-RNTI.

identifier for DCI formats (1 bits): a DCI format indicator and set to 1 at all times;

carrier indicator: an indicator indicating an index of a cell carrier in which data is transmitted;

BWP indicator: an indicator indicating a BWP in which data is transmitted;

frequency domain resource assignment: indicates frequency-axis resource allocation;

time domain resource assignment: indicates time-axis resource allocation;

frequency hopping flag: an indicator indicating whether to apply frequency hopping;

modulation and coding scheme: indicates a modulation order and a coding rate used in PUSCH transmission;

new data indicator: indicates whether the PUSCH is initially transmitted or retransmitted according to toggling;

redundancy version: indicates a redundancy version used in PUSCH transmission;

HARQ process number: indicates an HARQ process number used for PUSCH transmission;

downlink assignment index (DAI): DAI indicator;

transmit power control (TPC) command for scheduled PUSCH: PUSCH power control indicator;

sounding reference signal (SRS) resource indicator (SRI): an SRS resource indicator indicating that an upper-layer parameter 'usage' is one of SRS resources included in an SRS resource set designated as 'codeBook' or 'nonCodeBook';

precoding information and number of layers (transmission precoding matrix indicator (TPMI)): indicates the number of layers and precoding information used by the terminal for UL transmission when an upper-layer parameter 'txConfig' is configured as 'codebook'; and antenna ports: indicates a demodulation reference signal port (DMRS) and a code division multiplexing (CDM) group index used for UL transmission.

According to an embodiment of the disclosure, the base station may use DCI format 2_2 to control UL (PUSCH or physical uplink control channel (PUCCH)) transmission power of the terminal. DCI format 2_2 may include a total of N blocks 1 to N, each of which may include at least the following information:

closed loop indicator (0 or 1 bit): indicates PUSCH or PUCCH power control adjustment state; and TPC command (2 bits): indicates an accumulated value or an absolute value of $\delta_{PUSCH,b,f,c}$ and $\delta_{SRS,b,f,c}$ according to Table 5 when CRC of DCI format 2_2 is scrambled with TPC-PUSCH-RNTI, or indicates an accumulated value of $\delta_{PUCCH,b,f,c}0$ according to Table 6 when CRC of DCI format 2_2 is scrambled with TPC-PUCCH-RNTI.

TABLE 5

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
| --- | --- | --- |
| 0 | −1 | −4 |
| 1 | 0 | −1 |
| 2 | 1 | 1 |
| 3 | 3 | 4 |

TABLE 6

| TPC Command Field | Accumulated $\delta_{PUCCH,b,f,c}$ [dB] |
| --- | --- |
| 0 | −1 |
| 1 | 0 |
| 2 | 1 |
| 3 | 3 |

As can be seen from the information included in DCI format 0_1, the NR system may provide two UL transmission methods of 'codebook-based UL transmission' and 'non-codebook-based UL transmission'.

Figure 7:
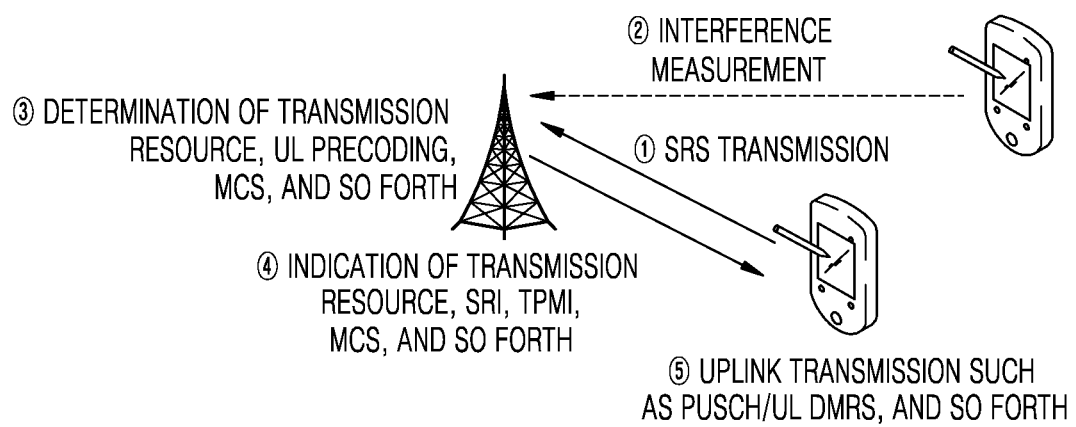
FIG. 7 illustrates a codebook-based UL transmission procedure according to an embodiment of the disclosure.

FIG. 7 illustrates a codebook-based UL transmission procedure according to an embodiment of the disclosure.

Referring to FIG. 7, the terminal may transmit an SRS according to a configuration or an order of the base station. The base station may properly receive a UL signal of a different terminal and measure interference. Thereafter, the base station may determine a UL resource, an SRS resource, a UL codebook modulation and coding scheme (MCS), etc., to be used by the terminal based on received SRS signal interference signal. The base station may indicate to the terminal, time/frequency domain assignment, SRI, TPMI, etc., corresponding to the determined information, through a UL grant such as DCI format 0_1. For codebook-based UL transmission, the base station may directly indicate a precoding matrix applied to a PUSCH and a UL DMRS through TPMI. The terminal may perform UL transmission with respect to a PUSCH, an SRS, a UL DMRS, etc., when the terminal successfully receives the UL grant.

Figure 8:
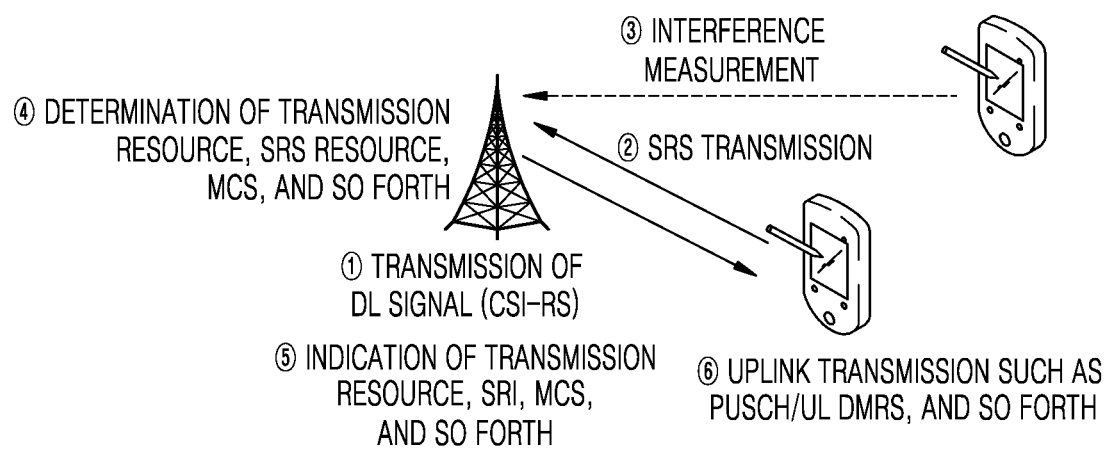
FIG. 8 illustrates a non-codebook-based UL transmission procedure according to an embodiment of the disclosure.

FIG. 8 illustrates a non-codebook-based UL transmission procedure according to an embodiment of the disclosure.

Referring to FIG. 8, the base station may transmit a DL signal such as a CSI reference signal (CSI-RS), to the terminal to allow the terminal to determine a transmission/reception beam direction based on the DL signal. Thereafter, the terminal may transmit an SRS in the measured beam direction in an associated CSI-RS based on the configuration or the instruction of the base station. The base station may properly receive a UL signal of a different terminal and measure interference. Thereafter, the base station may determine a UL resource, an SRS resource, etc., to be used by the terminal based on received SRS signal interference signal. The base station may indicate to the terminal, time/frequency domain assignment, SRI, etc., corresponding to the determined information, through a UL grant such as DCI format 0_1. For codebook-based UL transmission, the base station may implicitly indicate precoding applied to a PUSCH and a UL DMRS through SRI. When the terminal successfully receives the UL grant, the terminal may perform UL transmission with respect to a PUSCH, an SRS, a UL DMRS, etc., based on the received UL grant.

As described with reference to FIG. 2, in a UL of the NR system, DFT-s-OFDM having lower PAPR together with CP OFDM may be supported. The base station may configure the terminal to use DFT-s-OFDM in a UL coverage-limited situation, thus guaranteeing a lower power backoff and securing an additional coverage corresponding to a difference. In addition, in a Rel-15 NR system, pi/2 BPSK modulation for a PUSCH or a PUCCH may be supported. A constellation of pi/2 BPSK modulation may be as below.

$$d(i) = \frac{e^{j\frac{\pi}{2}(i \bmod 2)}}{\sqrt{2}}[(1-2b(i)) + j(1-2b(i))] \qquad \text{Equation 2}$$

In Equation 2, $b(i)$ indicates an $i^{th}$ input bit sequence, and $d(i)$ indicates an $i^{th}$ output modulation symbol.

Figure 9:
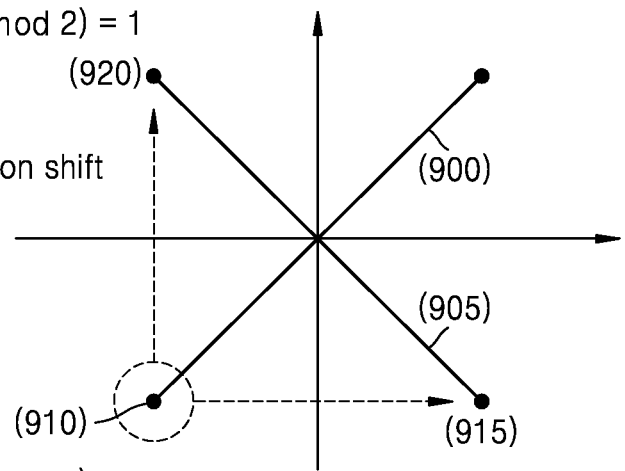
FIG. 9 illustrates an example of a pi/2 binary phase shift keying (BPSK) constellation according to an embodiment of the disclosure.

FIG. 9 illustrates an example of a pi/2 BPSK constellation according to an embodiment of the disclosure.

Referring to Equation 2 and FIG. 9, a constellation of pi/2 BPSK may vary with a time (i) from 900 to 905 or from 905 to 900. For example, it is assumed that an output modulation symbol exists at a position 910 at a point in time when i mod 2=0 is satisfied. In this case, the next output modulation symbol may satisfy (i+1) mod 2=1, such that an output modulation symbol may move to 915 or 920. That is, for pi/2 BPSK, zero crossing may not occur. More specifically, pi/2 BPSK has a smaller phase shift width between output modulation symbols over time than general BPSK or QPSK having a probability of zero crossing between output modulation symbols over time, resulting in lower PAPR performance.

In the NR system, the base station may indicate the use of DFT-s-OFDM to the terminal according to one of conditions shown in Table 7.

TABLE 7

For Msg3 PUSCH transmission, the UE shall consider the transform preceding either 'enabled' or 'disabled' according to the higher layer configured parameter msg3-transformPrecoder.
For PUSCH transmission scheduled by a PDCCH with CRC scrambled by CS-RNTI with NDI=1, C-RNTI, or MCS-C-RNTI or SP-CSI-RNTI:
- If the DCI with the scheduling grant was received with DCI format 0_0, the UE shall, for this PUSCH transmission, consider the transform precoding either enabled or disabled according to the higher layer configured parameter msg3-transformPrecoder.

TABLE 7-continued

- If the DCI with the scheduling grant was not received with DCI format 0_0
  - If the UE is configured with the higher layer parameter transformPrecoder in pusch-Config, the UE shall, for this PUSCH transmission, consider the transform precoding either enabled or disabled according to this parameter.
  - If the UE is not configured with the higher layer parameter transformPrecoder in pusch-Config, the UE shall, for this PUSCH transmission, consider the transform precoding either enabled or disabled according to the higher layer configured parameter msg3-transformPrecoder.
- For PUSCH transmission with a configured grant
- If the UE is configured with the higher layer parameter transformPrecoder in configuredGrantConfig, the UE shall, for this PUSCH transmission, consider the transform precoding either enabled or disabled according to this parameter.
- If the UE is not configured with the higher layer parameter transformPrecoder in configuredGrantConfig, the UE shall, for this PUSCH transmission, consider the transform precoding either enabled or disabled according to the higher layer configured parameter msg3-transformPrecoder.

In the NR system, the BS may indicate to the terminal configured to use DFT-s-OFDM whether to use PUSCH or PUCCH pi/2 BPSK through higher-layer signaling, and when the terminal is indicated to use pi/2 BPSK for PUSCH transmission, the terminal may apply q=1 in Table 8 and Table 9 (when the terminal is not indicated to use pi/2 BPSK for PUSCH transmission, the terminal may apply q=2 in Table 8 and Table 9, i.e., use QPSK for a corresponding part), and when the terminal is indicated to use pi/2 BPSK for PUCCH transmission, the terminal may use pi/2 BPSK instead of QPSK.

Table 8 is an MCS index table for PUSCH transformation precoding and 64QAM.

(MCS index table for PUSCH with transform precoding and 64QAM)

TABLE 8

| CS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | | reserved |
| 29 | 2 | | reserved |
| 30 | 4 | | reserved |
| 31 | 6 | | reserved |

Table 9 corresponds to MCS index table 2 for PUSCH transformation precoding and 64QAM.

(MCS index table 2 for PUSCH with transform precoding and 64QAM)

TABLE 9

| CS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | | reserved |
| 29 | 2 | | reserved |
| 30 | 4 | | reserved |
| 31 | 6 | | reserved |

Meanwhile, in the Rel-15 NR system, for a PUSCH DMRS and a PUCCH DMRS for DFT-s-OFDM, QPSK-based computer-generated sequence (CGS) may be provided as shown in Table 10.

TABLE 10

The low-PAPR sequence $r_{u,v}^{(\alpha,\delta)}(n)$ is defined by a cyclic shift $\alpha$ of a base sequence $\bar{r}_{u,v}(n)$ according to
$r_{u,v}^{(\alpha,\delta)}(n) = e^{j\alpha n}\bar{r}_{u,v}(n), 0 \leq n < M_{ZC}$
where $M_{ZC} = mN_{sc}^{RB}/2^{\delta}$ is the length of the sequence. Multiple sequence are defined from a single base sequence through different values of $\alpha$ and $\delta$.

TABLE 10-continued

Base sequences $\bar{r}_{u,v}(n)$ are divided into groups, where $u \in \{0, 1, \ldots, 29\}$ is the group number and v is the base sequence number within the group, such that each group contains one base sequence (v = 0) of each length $M_{ZC} = mN_{sc}^{RB}/2^\delta$, $1/2 \le m/2^\delta \le 5$ and two base sequences (v = 0, 1) of each length $M_{ZC} = mN_{sc}^{RB}/2^\delta$, $6 \le m/2^\delta$.
The definition of the base sequence $\bar{r}_{u,v}(0), \ldots, \bar{r}_{u,v}(M_{ZC} - 1)$ depends on the sequence length $M_{ZC}$.
5.2.2.1   Base sequences of length 36 or larger
For $M_{ZC} \ge 3N_{sc}^{RB}$, the base sequence $\bar{r}_{u,v}(0), \ldots, \bar{r}_{u,v}(M_{ZC} - 1)$ is given by $$\bar{r}_{u,v}(n) = x_q (n \bmod N_{ZC})$$

$$x_q(m) = e^{-j\frac{\pi qm(m+1)}{N_{ZC}}}$$

where $q = \lfloor \bar{q} + 1/2 \rfloor + v \cdot (-1)^{\lfloor 2\bar{q} \rfloor}$
$\bar{q} = N_{ZC} \cdot (u + 1)/31$
The length $N_{ZC}$ is given by the largest prime number such that $N_{ZC} < M_{ZC}$.
5.2.2.2   Base sequences of length less than 36
For $M_{ZC} \in \{6, 12, 18, 24\}$ the base sequence is given by
$\bar{r}_{u,v}(n) = e^{j\varphi(n)\pi/4}$, $0 \le n \le M_{ZC} - 1$
where the value of $\varphi(n)$ is given by Tables 5.2.2.2-1 to 5.2.2.2-4.
For $M_{ZC} = 30$, the base sequence $\bar{r}_{u,v}(0), \ldots, \bar{r}_{u,v}(M_{ZC} - 1)$ is given by $$\bar{r}_{u,v}(n) = e^{-j\frac{\pi(u+1)(n+1)(n+2)}{31}}, 0 \le n \le M_{ZC} - 1$$

Based on $r_{u,v}^{(\alpha,\delta)}(n)$ of Table 10, PUSCH DMRS and PUCCH DMRS sequence for DFT-s-OFDM may be generated using Equation 3 and Equation 4.

$$r(n) = r_{u,v}^{(\alpha,\delta)}(n)$$

$$n = 0, 1, \ldots, M_{sc}^{PUSCH}/2^\delta - 1 \quad \text{Equation 3}$$

When DFT-s-OFDM is used, Equation 3 is a PUSCH DMRS sequence generation method in which $\delta = 1$ and $\alpha = 0$ are used, and $M_{sc}^{PUSCH}$ may be defined as a "scheduled bandwidth for uplink transmission, expressed as a number of subcarriers".

$$r_l(m) = r_{u,v}^{(\alpha,\delta)}(m)$$

$$m = 0, 1, \ldots, M_{sc}^{PUCCH,s} - 1 \quad \text{Equation 4}$$

When DFT-s-OFDM is used, Equation 4 is a PUCCH DMRS sequence generation method for PUCCH format 3 or format 4 in which $M_{sc}^{PUCCH,s}$ may be defined as in Equation 5.

$$M_{RB}^{PUCCH,s} = \begin{cases} 2^{\alpha_2} \cdot 3^{\alpha_3} \cdot 5^{\alpha_5} & \text{for } PUCCH \text{ format 3} \\ 1 & \text{for } PUCCH \text{ format 4} \end{cases} \quad \text{Equation 5}$$

In Equation 5, $\alpha_2$, $\alpha_3$, $\alpha_5$ may be a positive integer and s may be 3 or 4.

Hereinbelow, for convenience of a description, Equation 3 and Equation 4 will be referred to as a Rel-15 PUSCH DMRS or Rel-15 PUCCH DMRS sequence. An Rel-15 PUSCH/PUCCH DMRS sequence may be a QPSK-based sequence as described above, and may have a higher PAPR than pi/2 BPSK, such that when a PUSCH or PUCCH is modulated with pi/2 BPSK, a PAPR of an OFDM symbol transmitting an RS in a UL transmission slot becomes higher than that of an OFDM symbol transmitting data. That is, it means that the terminal needs to a greater power backoff or a more amount of clipping to an OFDM symbol transmitting an RS, and eventually, the reception performance of the OFDM symbol transmitting the RS may degrade, limiting the reception performance of a UL slot.

In the disclosure, to solve the foregoing problem, a method of defining sequences collectively referred to as a Rel-16 PUSCH/PUCCH DMRS sequence and configuring the defined sequence for the terminal depending on a circumstance may be provided.

FIRST EMBODIMENT

According to an embodiment of the disclosure, Rel-16 PUSCH/PUCCH DMRS sequences having PAPR characteristics that are similar to a PUSCH or PUCCH modulated with pi/2 BPSK may be defined.

For a length-12 PUSCH or PUCCH DMRS sequence, a length-18 PUSCH or PUCCH DMRS sequence, and a length-24 PUSCH or PUCCH DMRS sequence, pi/2 BPSK modulation of Equation 2 may be performed based on values of Table 11 through Table 13, and DFT (or transform precoding) may be performed, thus obtaining a final Rel-16 PUSCH/PUCCH DMRS sequence.

TABLE 11

Length-12 CGS for pi/2 BPSK

| Index | b(0), ..., b(11) |
|---|---|
| 0 | 000000110110 |
| 1 | 000001000111 |
| 2 | 000001110111 |
| 3 | 110110101000 |
| 4 | 110010101001 |
| 5 | 101101001011 |
| 6 | 000100100010 |
| 7 | 010001001000 |
| 8 | 101111011011 |
| 9 | 101101111000 |
| 10 | 101101000110 |
| 11 | 101001001010 |
| 12 | 110000011110 |
| 13 | 010001101011 |
| 14 | 000001100011 |
| 15 | 000001001001 |
| 16 | 001001000001 |
| 17 | 000001101110 |
| 18 | 000111110001 |
| 19 | 100010000011 |
| 20 | 011110101111 |
| 21 | 011101001101 |
| 22 | 011111001000 |
| 23 | 011100000100 |
| 24 | 001111111100 |
| 25 | 011100110100 |
| 26 | 011101110111 |
| 27 | 011111100011 |
| 28 | 011110000011 |
| 29 | 011101111011 |

TABLE 12

Length-18 CGS for pi/2 BPSK

| Index | b(0), ..., b(17) |
|---|---|
| 0 | 000001000111110001 |
| 1 | 000000011111001001 |
| 2 | 000001111011101111 |
| 3 | 010110110001101011 |
| 4 | 110100101010011110 |
| 5 | 010101110010110110 |
| 6 | 000111000100011111 |
| 7 | 010100011010000011 |
| 8 | 001010001010010001 |
| 9 | 101100101010010001 |
| 10 | 101100011100000001 |
| 11 | 110110111011111000 |

TABLE 12-continued

Length-18 CGS for pi/2 BPSK

| Index | b(0), . . . , b(17) |
|---|---|
| 12 | 100010101000110101 |
| 13 | 101101011100000110 |
| 14 | 000001110110101100 |
| 15 | 001110110100011010 |
| 16 | 010010001110100111 |
| 17 | 010011011000000010 |
| 18 | 001001111000001100 |
| 19 | 000000010010011011 |
| 20 | 000001100001001111 |
| 21 | 111101011111001001 |
| 22 | 100100010011110111 |
| 23 | 001000111000100101 |
| 24 | 110110000000110110 |
| 25 | 110101011000010010 |
| 26 | 011111110010100100 |
| 27 | 011011100000001100 |
| 28 | 000110000000001100 |
| 29 | 011101101011101100 |

TABLE 13

Length-24 CGS for pi/2 BPSK b(0), . . . , b(23)

| | |
|---|---|
| 0 | 000000010011111001001001 |
| 1 | 000000010010110111000110 |
| 2 | 000000010010010011111011 |
| 3 | 000000001101100101011011 |
| 4 | 100111110110111011000111 |
| 5 | 101011011001111100110111 |
| 6 | 011001001111110111101101 |
| 7 | 101111111101100111001101 |
| 8 | 001001010001001000001110 |
| 9 | 000010011010000011000101 |
| 10 | 101000111001111011110010 |
| 11 | 001001000001110001001010 |
| 12 | 101001110100010111001011 |
| 13 | 101001101101010110110010 |
| 14 | 101000100111000001001011 |
| 15 | 100101001100001111111001 |
| 16 | 000111100101001110111001 |
| 17 | 110101110011100000011010 |
| 18 | 000000000111100010110001 |
| 19 | 100010101001000000000111 |
| 20 | 000000111011000110001010 |
| 21 | 011010111000010000100011 |
| 22 | 101001000001110010001011 |
| 23 | 100110101000011111110011 |
| 24 | 100011010100100111111000 |
| 25 | 101011000100011111100100 |
| 26 | 010010101100011111100100 |
| 27 | 010110101010110110010011 |
| 28 | 010001101010111010010011 |
| 29 | 010010011111111110010011 |

For a Rel-16 PUSCH/PUCCH DMRS sequence of a length of 30 or longer, the sequence may be generated according to the following rules:
For sequences with a length 30 or longer, a DMRS for pi/2 BPSK modulation for a PUSCH may be generated based on a Gold-sequence followed by pi/2 BPSK modulation followed by transform precoding resulting from a DMRS Type 1 comb structure; (For sequences with length 30 or larger, DMRS for pi/2 BPSK modulation for PUSCH is generated based on Gold-sequence followed by π/2 BPSK modulation followed by transform precoding resulting in a DMRS Type 1 comb structure)
For sequences with a length 30 or longer, a DMRS for pi/2 BPSK modulation for a PUSCH may be generated based on a Gold-sequence followed by pi/2 BPSK modulation followed by transform precoding;(For sequences with length 30 or larger, DMRS for π/2 BPSK modulation for PUCCH is generated based on Gold-sequence followed by π/2 BPSK modulation followed by transform precoding.)

For convenience of a description in the following embodiments of the disclosure, generation of a PUSCH or PUCCH DMRS sequence according to one of methods of the foregoing first embodiment of the disclosure will be referred to as a Rel-16 PUSCH/PUCCH DMRS sequence.

SECOND EMBODIMENT

According to an embodiment of the disclosure, a signaling structure, a terminal, and a method for selecting one of a Rel-15 PUSCH/PUCCH DMRS sequence and a Rel-16 PUSCH/PUCCH DMRS sequence may be provided.

Figure 10:
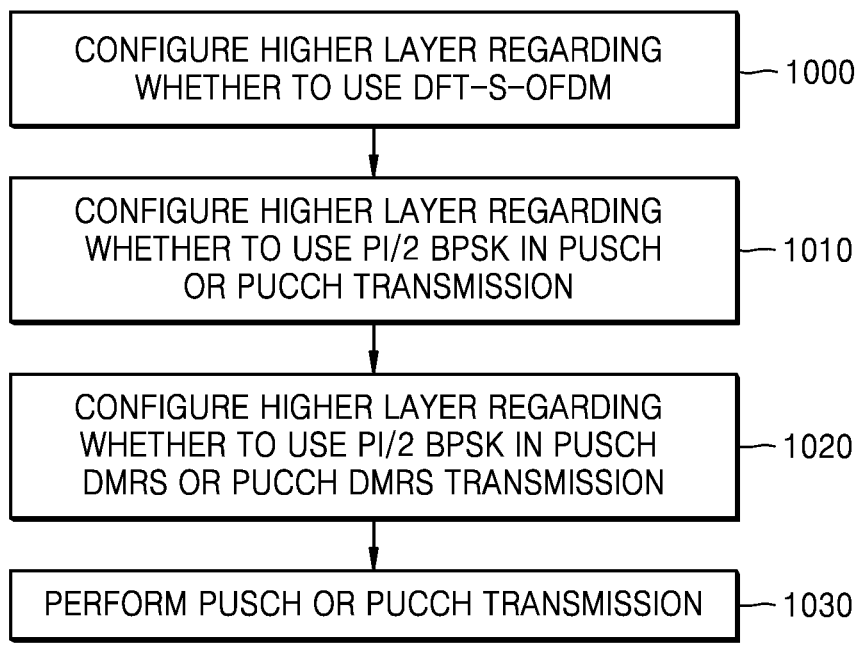
FIG. 10 illustrates a process of configuring a UL waveform and a pi/2 BPSK higher layer and transmitting a UL channel, according to an embodiment of the disclosure.

FIG. 10 illustrates a process of configuring a UL waveform and a pi/2 BPSK higher layer and transmitting a UL channel, according to an embodiment of the disclosure.

Referring to FIG. 10, a block diagram illustrates operations in which the base station indicates to the terminal whether a Rel-16 PUSCH/PUCCH DMRS is available and the terminal performs PUSCH/PUCCH transmission. Referring to FIG. 10, the base station may notify whether to apply DFT-s-OFDM (or transform precoding) to a PUSCH or a PUCCH through SIB or RRC configuration in operation 1000. The base station then may notify whether to apply pi/2 BPSK to PUSCH or PUCCH transmission through RRC configuration in operation 1010. When the terminal reports that pi/2 BPSK application to a PUSCH DMRS or PUCCH DMRS is possible through UE capability signaling (i.e., the terminal is capable of generating an Rel-16 PUSCH/PUCCH DMRS sequence), the base station may notify the terminal of whether to apply pi/2 BPSK to the PUSCH DMRS or the PUCCH DMRS through higher-layer signaling in operation 1020. The terminal may perform transmission with respect to a UL slot based on received information in operation 1030. Signaling in operation 1020 may be performed using an independent RRC parameter, but for the terminal having reported a UE capability for a Rel-16 PUSCH/PUCCH DMRS, signaling for operation 1010 may be preset to substitute for the signaling in operation 1020 or may be set as higher-layer signaling. (That is, for the terminal capable of generating the Rel-16 PUSCH/PUCCH DMRS sequence, the Rel-16 PUSCH/PUCCH DMRS sequence may be used according to whether to apply pi/2 BPSK to a PUSCH or PUCCH.)

When there are independent signals for notifying whether to use pi/2 BPSK of a PUSCH/PUCCH and whether to use pi/2 BPSK of a PUSCH/PUCCH DMRS, the base station may guarantee that "whether to use pi/2 BPSK of the PUSCH and whether to use pi/2 BPSK of the PUSCH DMRS" are matched or "whether to use pi/2 BPSK of the PUCCH" and "whether to use pi/2 BPSK of the PUCCH DMRS" are matched. By doing so, it may be possible to minimize limitation of a coverage of a Rel-16 terminal due to the bottleneck of one of the PUSCH/PUCCH and the PUSCH/PUCCH DMRS.

Figure 11:
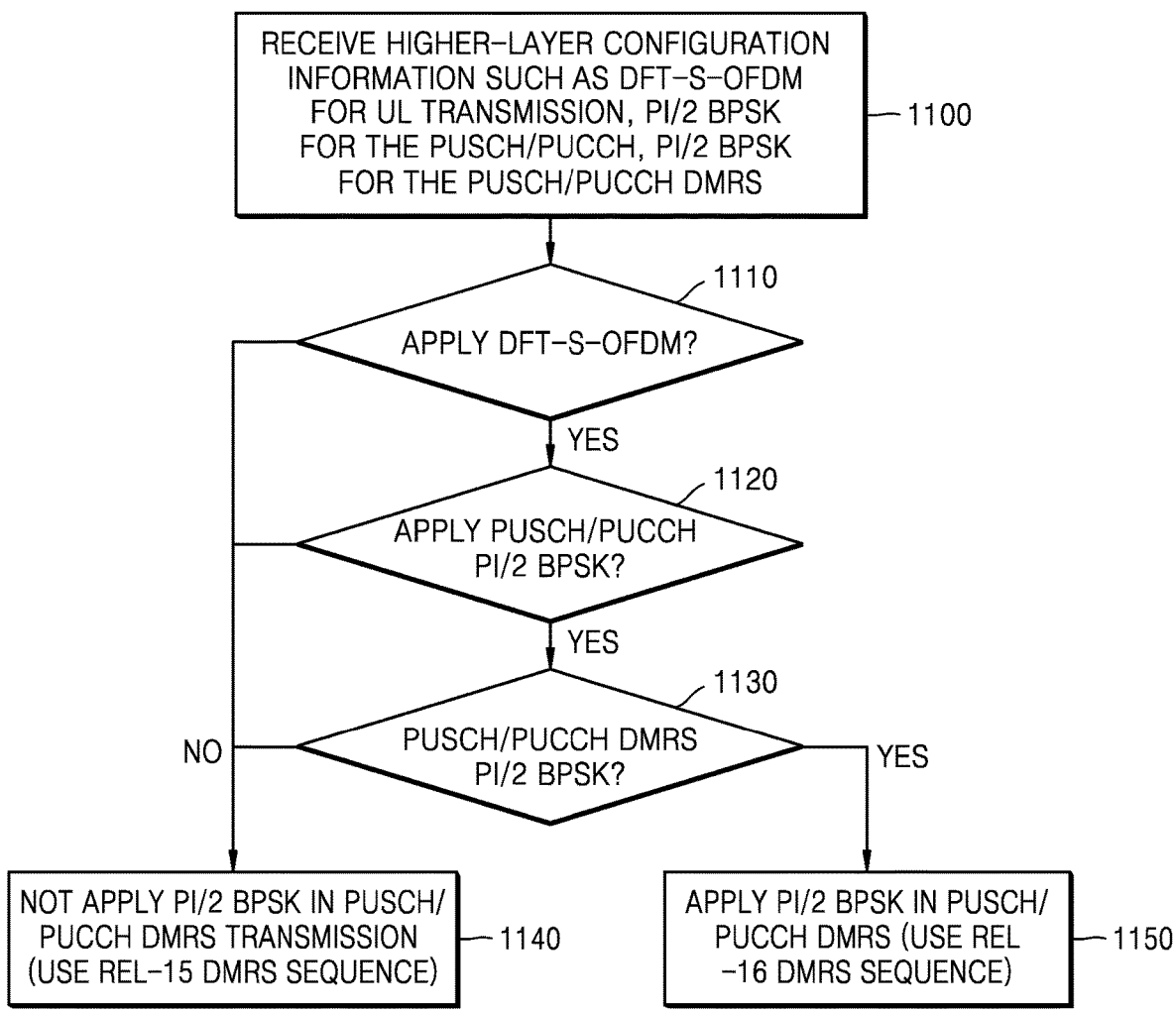
FIG. 11 illustrates an example of a method of determining a physical uplink shared channel (PUSCH)/physical uplink control channel (PUCCH) demodulation reference signal (DMRS) sequence, according to an embodiment of the disclosure.

FIG. 11 illustrates an example of a method of determining a PUSCH/PUCCH DMRS sequence, according to an embodiment of the disclosure.

Referring to FIG. 11, based on the foregoing signaling structure, the terminal may determine whether to use the Rel-15 PUSCH/PUCCH DMRS sequence or the Rel-16 PUSCH/PUCCH DMRS sequence as shown in FIG. 11.

Like the embodiment of the disclosure shown in FIG. 10, the terminal may receive various higher-layer configuration information such as DFT-s-OFDM for UL transmission, pi/2 BPSK for the PUSCH/PUCCH, pi/2 BPSK for the PUSCH/PUCCH DMRS, etc., in operation 1100. The three types of configuration information may be independently configured for various reasons such as a terminal-specific UL coverage, coexistence between different release terminals, etc. Meanwhile, to prevent an unnecessary process from being performed in the terminal and confusion in selection of the Rel-15 DMRS sequence and the Rel-16 DMRS sequence, a determination order as shown in FIG. 11 may be followed. First, the terminal may determine whether to apply DFT-s-OFDM to the PUSCH or the PUCCH in operation 1110, and for non-DFT-s-OFDM transmission (i.e., for CP OFDM-based UL transmission), the terminal may use the Rel-15 PUSCH/PUCCH DMRS sequence regardless of a determination result of operation 1120 or 1130, in operation 1140. When DFT-s-OFDM is used for UL transmission, the terminal may determine whether to apply pi/2 BPSK to the PUSCH or the PUCCH in operation 1120; when pi/2 BPSK is not used, the terminal may use the Rel-15 PUSCH/PUCCH DMRS sequence regardless of a determination result of operation 1130, in operation 1140. When DFT-s-OFDM is used for UL transmission and pi/2 BPSK is applied to the PUSCH/PUCCH, the terminal may determine whether to apply pi/2 BPSK to the PUSCH DMRS or the PUCCH DMRS in operation 1130 and use the Rel-16 PUSCH/PUCCH DMRS sequence based on a determination result of operation 1130 in operation 1150.

THIRD EMBODIMENT

According to an embodiment of the disclosure, a method of selecting one of a Rel-15 PUSCH/PUCCH DMRS sequence and a Rel-16 PUSCH/PUCCH DMRS sequence in operation 403 (Msg. 3) and operation 404 of FIG. 4 (ACK/NACK feedback, ACK/NACK for Msg. 4) in a random access process may be provided.

Figure 12:
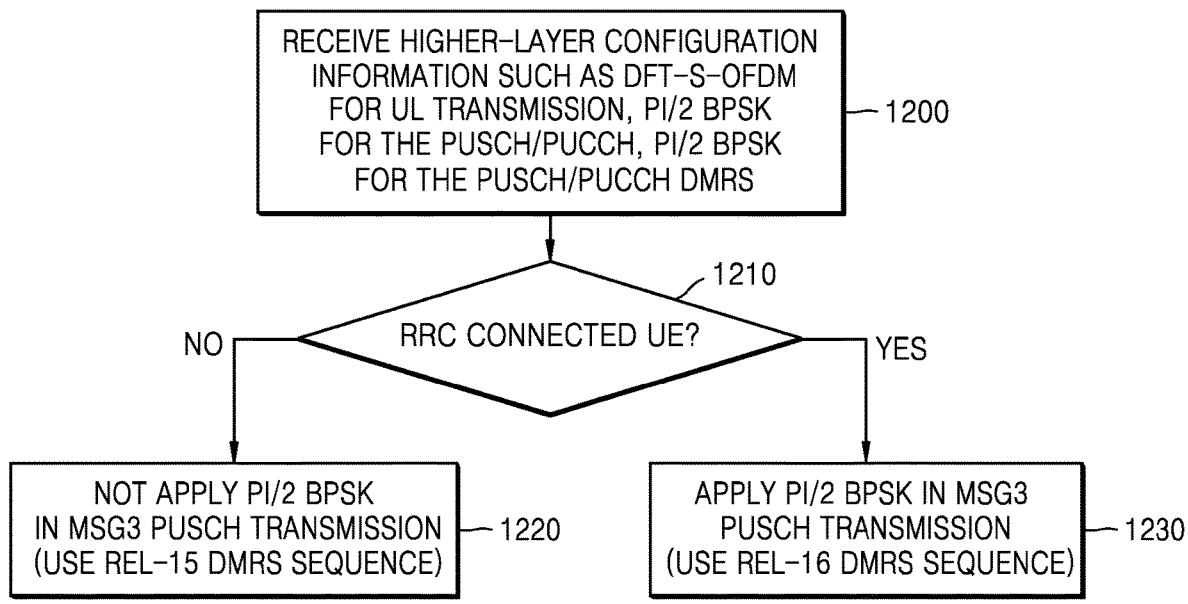
FIG. 12 illustrates an example of a method of determining a PUSCH/PUCCH DMRS sequence, based on a type of a random access, according to an embodiment of the disclosure.

FIG. 12 illustrates an example of a method of determining a PUSCH/PUCCH DMRS sequence, based on a type of a random access, according to an embodiment of the disclosure.

Referring to FIG. 12, a method is illustrated, performed by the terminal, for selecting a DMRS sequence for Msg. 3 transmission based on an RRC mode according to an embodiment of the disclosure. Referring to FIG. 12, the terminal may receive various higher-layer configuration information such as DFT-s-OFDM for UL transmission, pi/2 BPSK for the PUSCH/PUCCH, pi/2 BPSK for the PUSCH/PUCCH DMRS, etc., in operation 1200. To prevent confusion between the base station and the terminal in selection of the Rel-15 DMRS sequence and the Rel-16 DMRS sequence selection, an additional criterion may be determined based on an RRC connection state of the terminal in addition to the methods of the first embodiment and the second embodiment of the disclosure, in operation 1210. For example, when the terminal is in an RRC-connected mode and is determined to use the Rel-16 DMRS sequence according to the methods of the first and second embodiments of the disclosure, the terminal may determine that higher-layer configuration information is valid and uses the Rel-16 DMRS sequence for Msg. 3 transmission in operation 1230. On the other hand, when the terminal is not in the RRC-connected mode, i.e., is in an RRC-inactive mode or an RRC-idle mode, though being determined to use the Rel-16 DMRS sequence according to the methods of the first and second embodiments of the disclosure, the terminal may determine that higher-layer configuration information has lost validity and use the Rel-15 DMRS sequence for Msg. 3 transmission in operation 1220.

More specifically, the terminal may use at least one of the following methods in determining a DMRS sequence required for Msg. 3 transmission.

Method 1: indicates use of the Rel-15 or Rel-16 DMRS sequence for Msg. 3 by adding an independent higher-layer parameter into RRC information element (IE) RACH-ConfigCommon or RACH-Configdedicated. Thus, coexistence between the Rel-15 terminal and the Rel-16 terminal may be improved.

Method 2: For the Rel-16 terminal in which a higher-layer parameter msg3-transformPrecoder is set enabled (i.e., the terminal reporting through UE capability signaling that it is capable of generating the Rel-16 DMRS sequence), the Rel-16 DMRS sequence may be used; in other cases, the Rel-15 DMRS sequence may be used. Thus, a UL coverage may be maximized without an additional signaling load.

Method 3: For the Rel-16 terminal (i.e., the terminal reporting through UE capability signaling that it is capable of generating the Rel-16 DMRS sequence), the Rel-16 DMRS sequence may be used for Msg. 3 transmission when a PUSCH or PUCCH transmission power $P_{PUSCH}$ or $P_{PUCCH}$ is greater than or equal to a specific value due to a TPC command. For example, the specific value may be indicated/configured through higher layer or L1 signaling, or may be a preset value such as a UL maximum transmission power $P_{CMAX}$ of the terminal, etc.

More specifically, the terminal may use at least one of the following methods in determining a DMRS sequence required for ACK/NACK feedback transmission for Msg. 4.

Method 1: indicates use of the Rel-15 or Rel-16 DMRS sequence for ACK/NACK feedback transmission for Msg. 4 by adding an independent higher-layer parameter into RRC IE RACH-ConfigCommon or RACH-Configdedicated. Thus, coexistence between the Rel-15 terminal and the Rel-16 terminal may be improved.

Method 2: The Rel-16 terminal (i.e., the terminal reporting through UE capability signaling that it is capable of generating the Rel-16 DMRS sequence) may use the Rel-16 DMRS sequence for ACK/NACK feedback transmission for Msg. 4 based on DMRS sequence determination for Msg. 3; in other cases, the Rel-16 terminal may use the Rel-15 DMRS sequence. Thus, a UL coverage may be maximized without an additional signaling load.

Method 3: For the Rel-16 terminal (i.e., the terminal reporting through UE capability signaling that it is capable of generating the Rel-16 DMRS sequence), the Rel-16 DMRS sequence may be used for ACK/NACK feedback transmission for Msg. 4 transmission when a PUSCH or PUCCH transmission power $P_{PUSCH}$ or $P_{PUCCH}$ is greater than or equal to a specific value due to a TPC command. For example, the specific value may be indicated/configured through higher layer or L1 signaling, or may be a preset value such as a UL maximum transmission power $P_{CMAX}$ of the terminal, etc.

In application of the foregoing embodiments of the disclosure, when an indicator of whether to use the SIB-configured Rel-16 DMRS sequence and an indicator of whether to use the RRC-configured Rel-16 DMRS sequence are different from each other, the most recently configured value may be used.

In application of the foregoing embodiments of the disclosure, the embodiments of the disclosure may be applied to terminals having reported UE capability signaling for the Rel-16 DMRS sequence.

FOURTH EMBODIMENT

According to an embodiment of the disclosure, a method of selecting one of a Rel-15 PUSCH/PUCCH DMRS sequence and a Rel-16 PUSCH/PUCCH DMRS sequence based on a UL grant format may be provided.

Figure 13:
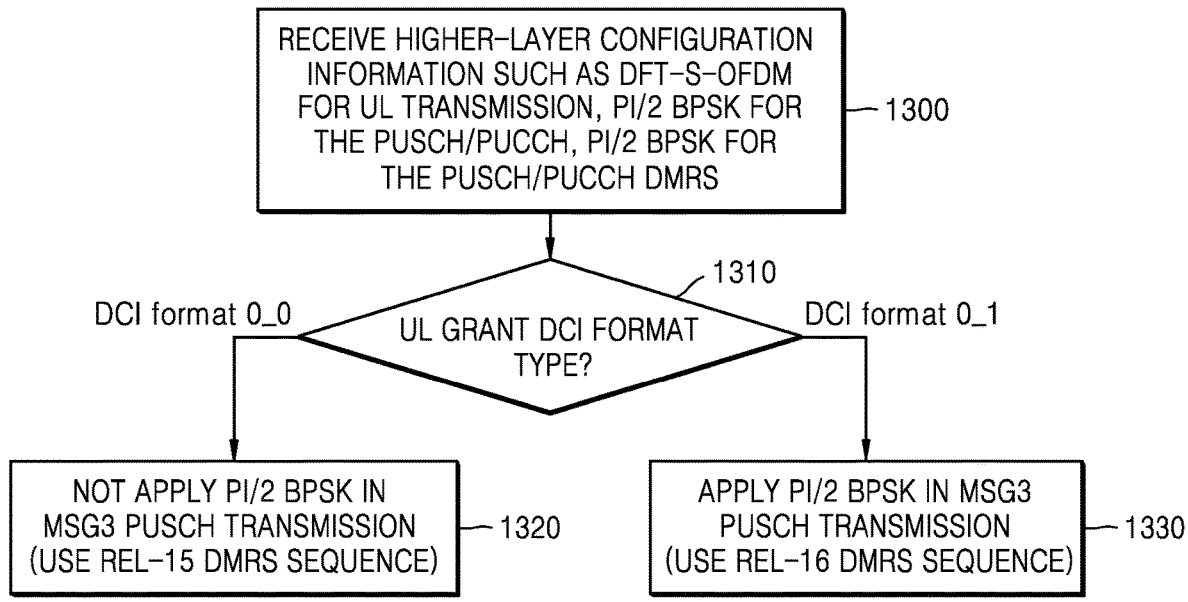
FIG. 13 illustrates an example of a method of determining a PUSCH/PUCCH DMRS sequence, based on a type of a UL grant downlink control information (DCI) format, according to an embodiment of the disclosure.

FIG. 13 illustrates an example of a method of determining a PUSCH/PUCCH DMRS sequence, based on a type of a UL grant DCI format, according to an embodiment of the disclosure.

Referring to FIG. 13, method is illustrated, performed by a terminal, for selecting a DMRS sequence based on a UL grant DCI format according to an embodiment of the disclosure. Referring to FIG. 13, the terminal may receive various higher-layer configuration information such as DFT-s-OFDM for UL transmission, pi/2 BPSK for the PUSCH/PUCCH, pi/2 BPSK for the PUSCH/PUCCH DMRS, etc., in operation 1300. To prevent confusion between the base station and the terminal in selection of the Rel-15 DMRS sequence and the Rel-16 DMRS sequence selection, an additional criterion may be determined based on a DCI format type of a UL grant that grants a resource to a UL slot, in addition to the methods of the first and second embodiments of the disclosure, in operation 1310. For example, according to the above-described methods of the first and second embodiments of the disclosure, when the terminal is determined to use the Rel-16 DMRS sequence and the UL grant has DCI format 0_1, the terminal may determine that higher-layer configuration information is valid, and thus may use the Rel-16 DMRS sequence in operation 1330. On the other hand, when the terminal is granted with the UL grant through DCI format 0_0, i.e., operates in a UL fallback mode, even though the terminal is determined to use the Rel-16 DMRS sequence according to the methods of the first and second embodiments of the disclosure, the terminal may determine that higher-layer configuration information may probably lose validity, and thus may use the Rel-15 DMRS sequence in operation 1320.

In application of the foregoing embodiments of the disclosure, when an indicator of whether to use the SIB-configured Rel-16 DMRS sequence and an indicator of whether to use the RRC-configured Rel-16 DMRS sequence are different from each other, the most recently configured value may be used.

In application of the foregoing embodiments of the disclosure, the embodiments of the disclosure may be applied to terminals having reported UE capability signaling for the Rel-16 DMRS sequence.

FIFTH EMBODIMENT

According to an embodiment of the disclosure, a method of selecting one of a Rel-15 PUSCH/PUCCH DMRS sequence and a Rel-16 PUSCH/PUCCH DMRS sequence based on a CORESET or SS may be provided.

Like the foregoing embodiments of the disclosure, the terminal may receive various higher-layer configuration information such as DFT-s-OFDM for UL transmission, pi/2 BPSK for the PUSCH/PUCCH, pi/2 BPSK for the PUSCH/PUCCH DMRS, etc., in operation 1300. To prevent confusion between the base station and the terminal in selection of the Rel-15 DMRS sequence and the Rel-16 DMRS sequence selection, an additional criterion may be determined based on a type of CORESET or SS including a UL grant that grants a resource to a UL slot, in addition to the methods of the first and second embodiments of the disclosure. For example, according to the above-described methods of the first and second embodiments of the disclosure, when the terminal is determined to use the Rel-16 DMRS sequence and the UL grant is not transmitted through CORESET 0 (or a common SS), the terminal may determine that the UL grant is a dedicated UL grant and higher-layer configuration information is valid, and thus may use the Rel-16 DMRS sequence. On the other hand, when the terminal is granted with a UL grant transmitted through CORESET 0 (or a common SS), the UL grant may be regarded as common information, such that even though the terminal is determined use the Rel-16 DMRS sequence according to the methods of the first and second embodiments of the disclosure, the terminal may use the Rel-15 DMRS sequence.

In application of the foregoing embodiments of the disclosure, when an indicator of whether to use the SIB-configured Rel-16 DMRS sequence and an indicator of whether to use the RRC-configured Rel-16 DMRS sequence are different from each other, the most recently configured value may be used.

In application of the foregoing embodiments of the disclosure, the embodiments of the disclosure may be applied to terminals having reported UE capability signaling for the Rel-16 DMRS sequence.

SIXTH EMBODIMENT

According to an embodiment of the disclosure, a method of selecting one of a Rel-15 PUSCH/PUCCH DMRS sequence and a Rel-16 PUSCH/PUCCH DMRS sequence based on L1 signaling may be provided.

To improve flexibility for DMRS sequence selection based on the first through fifth embodiments of the disclosure described above, L1 signaling may be introduced. For example, the base station may notify the Rel-16 terminal (i.e., the terminal having reported that it is capable of generating the Rel-16 DMRS sequence through UE capability signaling) of a possibility of using the Rel-16 DMRS sequence through higher-layer signaling, and may indicate whether to use the Rel-16 DMRS sequence through L1 signaling. To this end, the base station may use various methods such as introducing a new DCI field, performing joint encoding with an MCS indication field (for example, use the last code point of the MCS indication field as a Rel-16 DMRS sequence indicator), or performing joint encoding with a DMRS port indication field (for example, use the last code point of the DMRS port indication field as a Rel-16 DMRS sequence indicator).

Figure 14:
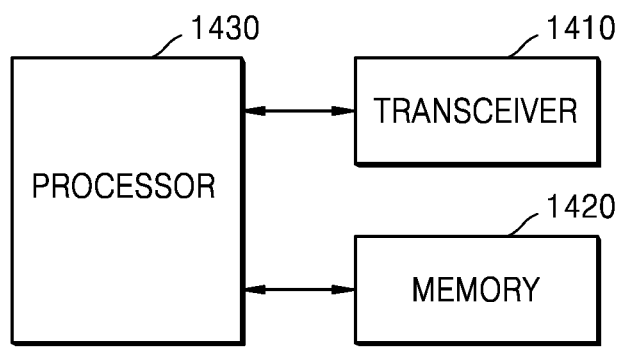
FIG. 14 is a block diagram illustrating an internal structure of a terminal, according to an embodiment of the disclosure.

FIG. 14 is a block diagram illustrating an internal structure of a terminal, according to an embodiment of the disclosure.

Referring to FIG. 14, the terminal for performing the foregoing embodiments of the disclosure may include a transceiver 1410, a memory 1420, and a processor 1430. In order for the terminal to perform a method of selecting a UL DMRS sequence according to the first through sixth embodiments of the disclosure, the processor 1430, the transceiver 1410, and the memory 1420 of the terminal may operate according to the respective embodiments of the disclosure. However, components of the terminal are not limited to the above-described example. For example, the terminal may include components that are more than or less than the above-described components. Moreover, the processor 1430, the transceiver 1410, and the memory 1420 may be implemented in a single chip form. The processor 1430 may also include at least one processor.

The transceiver 1410 may collectively refer to a receiver and a transmitter of the terminal and transmit and receive a signal to and from the base station. The signal transmitted and received to and from the base station may include control information and data. To this end, the transceiver 1410 may include a radio frequency (RF) transmitter that up-converts and amplifies a frequency of a transmission signal and an RF signal that low-noise-amplifies a received signal and down-converts a frequency. However, this is merely an example of the transceiver 1410, components of which are not limited to the RF transmitter and the RF receiver.

The transceiver 1410 may receive a signal through a radio channel and output the received signal to the processor 1430, and transmit a signal output from the processor 1430 through the radio channel.

The memory 1420 may store programs and data required for an operation of the terminal. The memory 1420 may also store control information or data included in a signal obtained by the terminal. The memory 1420 may include a storage medium such as read only memory (ROM), random access memory (RAM), hard-disk, compact disc (CD)-ROM, digital versatile disc (DVD), etc., or a combination thereof.

The processor 1430 may control a series of processes such that the terminal operates according to the above-described embodiment of the disclosure. For example, the transceiver 1410 may receive a data signal including a control signal, and the processor 1430 may determine a reception result for the data signal. In an embodiment of the disclosure, the processor 1430 may receive an RS from the base station and interpret an application method for the RS. The processor 1430 may also control the transceiver 1410 to transmit the RS.

Figure 15:
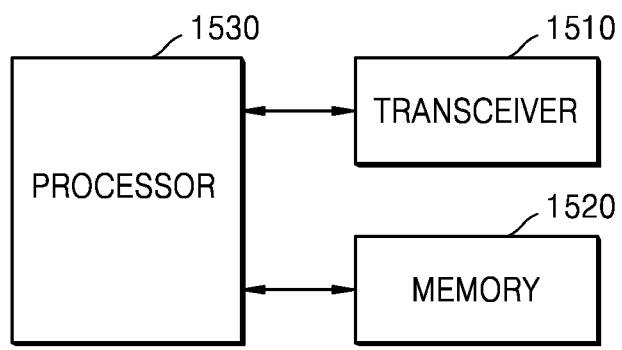
FIG. 15 is a block diagram illustrating an internal structure of a base station (BS) according to an embodiment of the disclosure.

The processor 1430 may differently control UL DMRS sequence mapping of the terminal based on a UL DMRS sequence selection method according to an embodiment of the disclosure. FIG. 15 is a block diagram of a structure of a BS according to an embodiment of the disclosure.

FIG. 15 is a block diagram illustrating an internal structure of a BS according to an embodiment of the disclosure.

Referring to FIG. 15, the base station may include a transceiver 1510, a memory 1520, and a processor 1530. According to the above-described communication method of the base station, the processor 1530, the transceiver 1510, and the memory 1520 of the base station may operate. However, components of the base station are not limited to the above-described example. For example, the base station may include components that are more than or less than the above-described components. Moreover, the processor 1530, the transceiver 1510, and the memory 1520 may be implemented in a single chip form. The processor 1530 may also include at least one processor.

The transceiver 1510 may collectively refer to a receiver and a transmitter of the base station and transmit and receive a signal to and from the terminal. The signal transmitted and received to and from the terminal by the base station may include control information and data. The transceiver 1510 may include an RF transmitter that up-converts and amplifies a frequency of a transmission signal and an RF signal that low-noise-amplifies a received signal and down-converts a frequency. However, this is merely an example of the transceiver 1510, components of which are not limited to the RF transmitter and the RF receiver. The transceiver 1510 may receive a signal through a radio channel and output the received signal to the processor 1530, and transmit a signal output from the processor 1530 through the radio channel.

The memory 1520 may store programs and data required for an operation of the base station. The memory 1520 may also store control information or data included in a signal obtained by the base station. The memory 1520 may include a storage medium such as ROM, RAM, hard-disk, CD-ROM, DVD, etc., or a combination thereof.

The processor 1530 may control a series of processes such that the base station operates according to the above-described embodiment of the disclosure. For example, the transceiver 1510 may receive a data signal including a control signal transmitted from the terminal, and the processor 1530 may determine a reception result for the control signal and the data signal transmitted from the terminal. In an embodiment of the disclosure, the processor 1530 may determine a structure of an RS, generate configuration information for the RS to be delivered to the terminal, generate a CSI-RS or DMRS sequence based on the configuration information, and transmit the CSI-RS or DMRS to the terminal.

Moreover, according to an embodiment of the disclosure, the processor 1530 may determine selection and mapping of a UL DMRS sequence based on a preset condition and thus control each element of the base station to receive the DMRS and the PUSCH or PUCCH.

The methods according to the embodiments of the disclosure described in the claims or specification of the disclosure may be implemented by hardware, software, or a combination thereof.

When the methods are implemented by software, a computer-readable storage medium having stored therein one or more programs (software modules) may be provided. The one or more programs stored in the computer-readable storage medium may be configured for execution by one or more processors in an electronic device. The one or more programs include instructions that cause the electronic device to execute the methods according to the embodiments of the disclosure described in the claims or the specification of the disclosure.

These programs (software modules and software) may be stored in RAM, non-volatile memories including flash memories, ROMs, EEPROMs, magnetic disc storage devices, CD-ROMs, DVDs, other types of optical storage devices, or magnetic cassettes. The programs may be stored in a memory configured by a combination of some or all of such storage devices. Also, each of the memories may be provided in plurality.

The programs may be stored to an attachable storage device of the electronic device accessible via the communication network such as Internet, Intranet, a local area network (LAN), a wireless LAN (WLAN), or storage area network (SAN), or a communication network by combining the networks. The storage device may access a device performing the embodiment of the disclosure through an external port. Furthermore, a separate storage device in a communication network may access a device performing the embodiment of the disclosure.

In the detailed embodiments of the disclosure, components included in the disclosure have been expressed as singular or plural according to the provided detailed embodiment of the disclosure. However, singular or plural expressions have been selected properly for a condition provided for convenience of a description, and the disclosure is not limited to singular or plural components and components expressed as plural may be configured as a single component or a component expressed as singular may also be configured as plural components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, first information through a system information block (SIB) or a higher layer signaling, the first information indicating that a transform precoding is enabled;
   receiving, from the base station, second information and third information through the higher layer signaling, the second information indicating that a pi/2 binary phase shift keying (BPSK) modulation is used for a physical uplink shared channel (PUSCH), and the third information indicating that a first demodulation reference signal (DMRS) is used for the PUSCH with the pi/2 BPSK modulation;
   identifying that the transform precoding is enabled for the PUSCH based on the first information;
   generating a first sequence, in case that the transform precoding is enabled for the PUSCH, the pi/2 BPSK modulation is used for the PUSCH, and the first DMRS is used for the PUSCH with the pi/2 BPSK modulation; and
   transmitting, to the base station, the first DMRS for the PUSCH using the first sequence.

2. The method of claim 1, wherein the first sequence is used for a second DMRS associated with a physical uplink control channel (PUCCH), in case that the transform precoding is enabled, and the pi/2 BPSK modulation is used for the PUCCH.

3. The method of claim 2,
   wherein a second sequence is used for the PUSCH, in case that the transform precoding is disabled, the pi/2 BPSK modulation is not used for the PUSCH, or the first DMRS is not used for the PUSCH with the pi/2 BPSK modulation, and
   wherein the second sequence is used for the PUCCH, in case that the transform precoding is disabled, or the pi/2 BPSK modulation is not used for the PUCCH.

4. The method of claim 3, wherein the first sequence is associated with low peak to average power ratio as compared to the second sequence.

5. The method of claim 1, wherein the PUSCH is not scheduled using DCI format 0_0.

6. A terminal in a wireless communication system, the terminal comprising:
   a transceiver; and
   at least one processor coupled with the transceiver,
   wherein the at least one processor is configured to:
      receive, from a base station, first information through a system information block (SIB) or a higher layer signaling, the first information indicating that a transform precoding is enabled,
      receive, from the base station, second information and third information through the higher layer signaling, the second information indicating that a pi/2 binary phase shift keying (BPSK) modulation is used for a physical uplink shared channel (PUSCH), and the third information indicating that a first demodulation reference signal (DMRS) is used for the PUSCH with the pi/2 BPSK modulation,
      identify that the transform precoding is enabled for the PUSCH based on the first information,
      generate a first sequence, in case that the transform precoding is enabled for the PUSCH, the pi/2 BPSK modulation is used for the PUSCH, and the first DMRS is used for the PUSCH with the pi/2 BPSK modulation, and
      transmit, to the base station, the first DMRS for the PUSCH using the first sequence.

7. The terminal of claim 6, wherein the first sequence is used for a second DMRS associated with a physical uplink control channel (PUCCH), in case that the transform precoding is enabled, and the pi/2 BPSK modulation is used for the PUCCH.

8. The terminal of claim 7,
   wherein a second sequence is used for the PUSCH, in case that the transform precoding is disabled, the pi/2 BPSK modulation is not used for the PUSCH, or the first DMRS is not used for the PUSCH with the pi/2 BPSK modulation, and
   wherein the second sequence is used for the PUCCH, in case that the transform precoding is disabled, or the pi/2 BPSK modulation is not used for the PUCCH.

9. The terminal of claim 8, wherein the first sequence is associated with low peak to average power ratio as compared to the second sequence.

10. The terminal of claim 6, wherein the PUSCH is not scheduled using DCI format 0_0.

11. A method performed by a base station in a wireless communication system, the method comprising:
    transmitting first information through a system information block (SIB) or a higher layer signaling, the first information indicating that a transform precoding is enabled;
    transmitting, to a user equipment (UE), second information and third information through the higher layer signaling, the second information indicating that a pi/2 binary phase shift keying (BPSK) modulation is used for a physical uplink shared channel (PUSCH), and the third information indicating that a first demodulation reference signal (DMRS) is used for the PUSCH with the pi/2 BPSK modulation; and
    receiving, from the UE, the first DMRS for the PUSCH using a first sequence,
    wherein the first sequence is generated, in case that the transform precoding is enabled for the PUSCH, the pi/2 BPSK modulation is used for the PUSCH, and the first DMRS is used for the PUSCH with the pi/2 BPSK modulation.

12. The method of claim 11, wherein the first sequence is used for a second DMRS associated with a physical uplink control channel (PUCCH), in case that the transform precoding is enabled, and the pi/2 BPSK modulation is used for the PUCCH.

13. The method of claim 12,
    wherein a second sequence is used for the PUSCH, in case that the transform precoding is disabled, the pi/2 BPSK modulation is not used for the PUSCH, or the first DMRS is not used for the PUSCH with the pi/2 BPSK modulation, and
    wherein the second sequence is used for the PUCCH, in case that the transform precoding is disabled, or the pi/2 BPSK modulation is not used for the PUCCH.

14. The method of claim 13, wherein the first sequence is associated with low peak to average power ratio as compared to the second sequence.

15. The method of claim 11, wherein the PUSCH is not scheduled using DCI format 0_0.

16. A base station in a wireless communication system, the base station comprising:
- a transceiver; and
- at least one processor coupled with the transceiver, wherein the at least one processor is configured to:
  - transmit first information through a system information block (SIB) or a higher layer signaling, the first information indicating that a transform precoding is enabled,
  - transmit, to a user equipment (UE), second information and third information through the higher layer signaling, the second information indicating that a pi/2 binary phase shift keying (BPSK) modulation is used for a physical uplink shared channel (PUSCH), and the third information indicating that a first demodulation reference signal (DMRS) is used for the PUSCH with the pi/2 BPSK modulation,
  - receive, from the UE, the first DMRS for the PUSCH using a first sequence,
  - wherein the first sequence is generated, in case that the transform precoding is enabled for the PUSCH, the pi/2 BPSK modulation is used for the PUSCH, and the first DMRS is used for the PUSCH with the pi/2 BPSK modulation.

17. The base station of claim 16, wherein the first sequence is used for a second DMRS associated with a physical uplink control channel (PUCCH), in case that the transform precoding is enabled, and the pi/2 BPSK modulation is used for the PUCCH.

18. The base station of claim 17,
   wherein a second sequence is used for the PUSCH, in case that the transform precoding is disabled, the pi/2 BPSK modulation is not used for the PUSCH, or the first DMRS is not used for the PUSCH with the pi/2 BPSK modulation, and
   wherein the second sequence is used for the PUCCH, in case that the transform precoding is disabled, or the pi/2 BPSK modulation is not used for the PUCCH.

19. The base station of claim 18, wherein the first sequence is associated with low peak to average power ratio as compared to the second sequence.

20. The base station of claim 15, wherein the PUSCH is not scheduled using DCI format 0_0.

* * * * *